(12) United States Patent
Abe

(10) Patent No.: US 7,913,090 B2
(45) Date of Patent: Mar. 22, 2011

(54) AUTHENTICATION SYSTEMS AND AUTHENTICATION METHOD

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1070 days.

(21) Appl. No.: 11/573,859

(22) PCT Filed: Aug. 12, 2005

(86) PCT No.: PCT/JP2005/014816
§ 371 (c)(1),
(2), (4) Date: Feb. 16, 2007

(87) PCT Pub. No.: WO2006/019045
PCT Pub. Date: Feb. 23, 2006

(65) Prior Publication Data
US 2008/0040614 A1    Feb. 14, 2008

(30) Foreign Application Priority Data
Aug. 19, 2004   (JP) ................. 2004-239439

(51) Int. Cl.
*H04L 9/00* (2006.01)
*H04L 9/32* (2006.01)
(52) U.S. Cl. .......................... 713/186; 726/2
(58) Field of Classification Search .......... 713/182–186, 713/168; 726/2–5; 382/115–118, 124
See application file for complete search history.

(56) References Cited

U.S. PATENT DOCUMENTS

| 4,407,299 A | 10/1983 | Culver |
| 5,941,820 A | 8/1999 | Zimmerman |
| 6,028,949 A * | 2/2000 | McKendall ................ 382/117 |
| 7,627,144 B2 | 12/2009 | Abe |
| 2002/0118864 A1 | 8/2002 | Kondo et al. |
| 2003/0051147 A1 | 3/2003 | Maeda et al. |
| 2004/0034479 A1 | 2/2004 | Shimase et al. |

FOREIGN PATENT DOCUMENTS

| JP | 2002-259981 | 9/2002 |
| JP | 2003-44832 | 2/2003 |
| JP | 2003-67340 | 3/2003 |
| JP | 2003-99780 | 4/2003 |
| JP | 3439359 | 6/2003 |

* cited by examiner

*Primary Examiner* — Hosuk Song
(74) *Attorney, Agent, or Firm* — K&L Gates LLP

(57) ABSTRACT

An authentication system and method thereof are provided. A threshold value determination unit determines a threshold value Xth so that a Mahalanobis distance defined by a mean value μt of a true profile and a standard deviation σt and the Mahalanobis distance defined by a mean value μo of the other profile and a standard deviation σo coincide.

11 Claims, 18 Drawing Sheets

FIG. 15

TABLE

| | z | 0 | 1 | 2 | 3 | 4 | 5 | 6 | 7 | 8 | 9 |
|---|---|---|---|---|---|---|---|---|---|---|---|
| | 0 | 0.5 | 0.496011 | 0.492022 | 0.488033 | 0.484047 | 0.480061 | 0.476078 | 0.472097 | 0.468119 | 0.464144 |
| | 0.1 | 0.460172 | 0.456205 | 0.452242 | 0.448283 | 0.44433 | 0.440382 | 0.436441 | 0.432505 | 0.428576 | 0.424655 |
| | 0.2 | 0.42074 | 0.416834 | 0.412936 | 0.409046 | 0.405165 | 0.401294 | 0.397432 | 0.39358 | 0.389739 | 0.385908 |
| | 0.3 | 0.382089 | 0.378281 | 0.374484 | 0.3707 | 0.366928 | 0.363169 | 0.359424 | 0.355691 | 0.351973 | 0.348268 |
| | 0.4 | 0.344578 | 0.340903 | 0.337243 | 0.333598 | 0.329969 | 0.326355 | 0.322758 | 0.319178 | 0.315614 | 0.312067 |
| | 0.5 | 0.308538 | 0.305026 | 0.301532 | 0.298056 | 0.294598 | 0.29116 | 0.28774 | 0.284339 | 0.280957 | 0.277595 |
| | 0.6 | 0.274253 | 0.270931 | 0.267629 | 0.264347 | 0.261086 | 0.257846 | 0.254627 | 0.251429 | 0.248252 | 0.245097 |
| | 0.7 | 0.241964 | 0.238852 | 0.235762 | 0.232695 | 0.22965 | 0.226627 | 0.223627 | 0.22065 | 0.217695 | 0.214764 |
| | 0.8 | 0.211855 | 0.20897 | 0.206108 | 0.203269 | 0.200454 | 0.197662 | 0.194894 | 0.19215 | 0.18943 | 0.186733 |
| | 0.9 | 0.18406 | 0.181411 | 0.178786 | 0.176186 | 0.173609 | 0.171056 | 0.168528 | 0.166023 | 0.163543 | 0.161087 |
| σ | 1 | 0.158655 | 0.156248 | 0.153864 | 0.151505 | 0.14917 | 0.146859 | 0.144572 | 0.14231 | 0.140071 | 0.137857 |
| | 1.1 | 0.135666 | 0.1335 | 0.131357 | 0.129238 | 0.127143 | 0.125072 | 0.123024 | 0.121001 | 0.119 | 0.117023 |
| | 1.2 | 0.11507 | 0.11314 | 0.111233 | 0.109349 | 0.107488 | 0.10565 | 0.103835 | 0.102042 | 0.100273 | 0.098525 |
| | 1.3 | 0.096801 | 0.095098 | 0.093418 | 0.091759 | 0.090123 | 0.088508 | 0.086915 | 0.085344 | 0.083793 | 0.082264 |
| | 1.4 | 0.080757 | 0.07927 | 0.077804 | 0.076359 | 0.074934 | 0.073529 | 0.072145 | 0.070781 | 0.069437 | 0.068112 |
| | 1.5 | 0.066807 | 0.065522 | 0.064256 | 0.063008 | 0.06178 | 0.060571 | 0.05938 | 0.058208 | 0.057053 | 0.055917 |
| | 1.6 | 0.054799 | 0.053699 | 0.052616 | 0.051551 | 0.050503 | 0.049471 | 0.048457 | 0.04746 | 0.046479 | 0.045514 |
| | 1.7 | 0.044565 | 0.043633 | 0.042716 | 0.041815 | 0.040929 | 0.040059 | 0.039204 | 0.038364 | 0.037538 | 0.036727 |
| | 1.8 | 0.03593 | 0.035148 | 0.034379 | 0.033625 | 0.032884 | 0.032157 | 0.031443 | 0.030742 | 0.030054 | 0.029379 |
| | 1.9 | 0.028716 | 0.028067 | 0.027429 | 0.026803 | 0.02619 | 0.025588 | 0.024998 | 0.024419 | 0.023852 | 0.023295 |
| 2σ | 2 | 0.02275 | 0.022216 | 0.021692 | 0.021178 | 0.020675 | 0.020182 | 0.019699 | 0.019226 | 0.018763 | 0.018309 |
| | 2.1 | 0.017864 | 0.017429 | 0.017003 | 0.016586 | 0.016177 | 0.015778 | 0.015386 | 0.015003 | 0.014629 | 0.014262 |
| | 2.2 | 0.013903 | 0.013553 | 0.013209 | 0.012874 | 0.012545 | 0.012224 | 0.011911 | 0.011604 | 0.011304 | 0.011011 |
| | 2.3 | 0.010724 | 0.010444 | 0.01017 | 0.009903 | 0.009642 | 0.009387 | 0.009137 | 0.008894 | 0.008656 | 0.008424 |
| | 2.4 | 0.008198 | 0.007976 | 0.00776 | 0.007549 | 0.007344 | 0.007143 | 0.006947 | 0.006756 | 0.006569 | 0.006387 |
| | 2.5 | 0.00621 | 0.006037 | 0.005868 | 0.005703 | 0.005543 | 0.005386 | 0.005234 | 0.005085 | 0.00494 | 0.004799 |
| | 2.6 | 0.004661 | 0.004527 | 0.004397 | 0.004269 | 0.004145 | 0.004025 | 0.003907 | 0.003793 | 0.003681 | 0.003573 |
| | 2.7 | 0.003467 | 0.003364 | 0.003264 | 0.003167 | 0.003072 | 0.00298 | 0.00289 | 0.002803 | 0.002718 | 0.002635 |
| | 2.8 | 0.002555 | 0.002477 | 0.002401 | 0.002327 | 0.002256 | 0.002186 | 0.002118 | 0.002052 | 0.001988 | 0.001926 |
| | 2.9 | 0.001866 | 0.001807 | 0.00175 | 0.001695 | 0.001641 | 0.001589 | 0.001538 | 0.001489 | 0.001441 | 0.001395 |
| 3σ | 3 | 0.00135 | 0.001306 | 0.001264 | 0.001223 | 0.001183 | 0.001144 | 0.001107 | 0.00107 | 0.001035 | 0.001001 |
| | 3.1 | 0.000968 | 0.000936 | 0.000904 | 0.000874 | 0.000845 | 0.000816 | 0.000789 | 0.000762 | 0.000736 | 0.000711 |
| | 3.2 | 0.000687 | 0.000664 | 0.000641 | 0.000619 | 0.000598 | 0.000577 | 0.000557 | 0.000538 | 0.000519 | 0.000501 |
| | 3.3 | 0.000483 | 0.000467 | 0.00045 | 0.000434 | 0.000419 | 0.000404 | 0.00039 | 0.000376 | 0.000362 | 0.00035 |
| | 3.4 | 0.000337 | 0.000325 | 0.000313 | 0.000302 | 0.000291 | 0.00028 | 0.00027 | 0.00026 | 0.000251 | 0.000242 |
| | 3.5 | 0.000233 | 0.000224 | 0.000216 | 0.000208 | 0.0002 | 0.000193 | 0.000185 | 0.000179 | 0.000172 | 0.000165 |
| | 3.6 | 0.000159 | 0.000153 | 0.000147 | 0.000142 | 0.000136 | 0.000131 | 0.000126 | 0.000121 | 0.000117 | 0.000112 |
| | 3.7 | 0.000108 | 0.000104 | 9.96E-05 | 9.58E-05 | 9.2E-05 | 8.84E-05 | 8.5E-05 | 8.16E-05 | 7.84E-05 | 7.53E-05 |
| | 3.8 | 7.24E-05 | 6.95E-05 | 6.67E-05 | 6.41E-05 | 6.15E-05 | 5.91E-05 | 5.67E-05 | 5.44E-05 | 5.22E-05 | 5.01E-05 |
| | 3.9 | 4.81E-05 | 4.62E-05 | 4.43E-05 | 4.25E-05 | 4.08E-05 | 3.91E-05 | 3.75E-05 | 3.6E-05 | 3.45E-05 | 3.31E-05 |
| 4σ | 4 | 3.17E-05 | 3.04E-05 | 2.91E-05 | 2.79E-05 | 2.67E-05 | 2.56E-05 | 2.45E-05 | 2.35E-05 | 2.25E-05 | 2.16E-05 |
| | 4.1 | 2.07E-05 | 1.98E-05 | 1.9E-05 | 1.81E-05 | 1.74E-05 | 1.66E-05 | 1.59E-05 | 1.52E-05 | 1.46E-05 | 1.4E-05 |
| | 4.2 | 1.34E-05 | 1.28E-05 | 1.22E-05 | 1.17E-05 | 1.12E-05 | 1.07E-05 | 1.02E-05 | 9.78E-06 | 9.35E-06 | 8.94E-06 |
| | 4.3 | 8.55E-06 | 8.17E-06 | 7.81E-06 | 7.46E-06 | 7.13E-06 | 6.81E-06 | 6.51E-06 | 6.22E-06 | 5.94E-06 | 5.67E-06 |
| | 4.4 | 5.42E-06 | 5.17E-06 | 4.94E-06 | 4.72E-06 | 4.5E-06 | 4.3E-06 | 4.1E-06 | 3.91E-06 | 3.74E-06 | 3.56E-06 |
| | 4.5 | 3.4E-06 | 3.24E-06 | 3.08E-06 | 2.95E-06 | 2.82E-06 | 2.68E-06 | 2.56E-06 | 2.44E-06 | 2.33E-06 | 2.22E-06 |
| | 4.6 | 2.11E-06 | 2.02E-06 | 1.92E-06 | 1.83E-06 | 1.74E-06 | 1.66E-06 | 1.58E-06 | 1.51E-06 | 1.44E-06 | 1.37E-06 |
| | 4.7 | 1.3E-06 | 1.24E-06 | 1.18E-06 | 1.12E-06 | 1.07E-06 | 1.02E-06 | 9.69E-07 | 9.22E-07 | 8.78E-07 | 8.35E-07 |
| | 4.8 | 7.94E-07 | 7.56E-07 | 7.19E-07 | 6.84E-07 | 6.5E-07 | 6.18E-07 | 5.88E-07 | 5.59E-07 | 5.31E-07 | 5.05E-07 |
| | 4.9 | 4.8E-07 | 4.56E-07 | 4.33E-07 | 4.12E-07 | 3.91E-07 | 3.72E-07 | 3.53E-07 | 3.35E-07 | 3.18E-07 | 3.02E-07 |
| 5σ | 5 | 2.87E-07 | 2.73E-07 | 2.59E-07 | 2.46E-07 | 2.33E-07 | 2.21E-07 | 2.1E-07 | 1.99E-07 | 1.89E-07 | 1.79E-07 |

AUTHENTICATION SYSTEMS AND AUTHENTICATION METHOD

CROSS REFERENCE TO RELATED APPLICATIONS

The present application claims priority to Japanese Patent Document No. 2004-239439 filed in Japan on Aug. 19, 2004, the contents of which are herein incorporated by reference.

BACKGROUND

The present invention relates to an authentication system for biometric authentication authenticating a biometric subject based on a characteristic quantity acquired from the related biometric subject and a method of same.

In a communication system for communication via a network and a predetermined processing system etc., it is sometimes authenticated whether or not the user is a legitimate user.

Such authentication includes for example biometric authentication reading biometric data such as fingerprints and vein patterns from the user and performing the authentication based on correlation values of inspected characteristic data showing characteristic features inherent to the user extracted from the biometric data and previously held comparative characteristic data.

In such biometric authentication, how a threshold value of the correlation value set as the standard for judging whether or not the user is the true person or another person is determined is important for achieving a high reliability.

Namely, the probability of erroneously judging another person as the true person, that is, a False Acceptance Rate (FAR), and the probability of erroneously judging a true person as if he were not the true person, that is, a False Rejection Rate (FRR), are determined according to the method of determination of the threshold value.

The method of determination of the threshold value includes a variety of methods such as the method shown in the following Patent Document 1.

Patent Document 1: Japanese Patent No. 3439359

SUMMARY

The reliability of the authentication systems explained above depends upon how the above threshold value is determined.

At present, there is a demand for further raising the reliability of the authentication according to the authentication systems explained above.

Further, there is a demand for realizing a desired false acceptance rate FAR and the false rejection rate FRR in accordance with the characteristics etc. of the service for which the authentication is used.

The present invention has as its object to solve the problems of the prior art explained above by providing an authentication system and an authentication method enabling authentication with a high reliability in comparison with the prior art.

Further, another object of the present invention is to provide an authentication system and an authentication method able to realize a desired false acceptance rate or false rejection rate in accordance with the characteristics etc. of the service for which the authentication is used.

To solve the problems of the prior art explained above and achieve the above object, the authentication system of a first aspect of the invention is an authentication system for comparing a correlation value between inspected characteristic data of biometric data acquired from a biometric subject being inspected and comparative data linked with the predetermined biometric subject and a predetermined threshold value linked with the predetermined biometric subject to authenticate whether or not the biometric subject being inspected is the predetermined biometric subject, including: a storing means for storing a threshold value defined so that a value obtained by dividing an absolute value of a difference between a first mean value of a plurality of first correlation values generated by detecting correlation with the comparative data for a plurality of first characteristic data previously acquired from the predetermined biometric subject and the threshold value by a standard deviation of the plurality of first correlation values and values obtained by dividing an absolute value of a difference between a second mean value of a plurality of second correlation values generated by detecting correlation with the comparative data for a plurality of second characteristic data previously acquired from a biometric subject other than the predetermined biometric subject and the threshold value by the plurality of second correlation values coincide; and an authenticating means for comparing the inspected characteristic data and the threshold value read out from the storing means to authenticate whether or not the biometric subject being inspected is the predetermined biometric subject.

The mode of operation of the authentication system of the first aspect of the invention is as follows.

The authenticating means authenticates whether or not the biometric subject being inspected is the predetermined biometric subject by comparing the inspected characteristic data and the threshold value read out from the storing means.

An authentication method of a second aspect of the invention is an authentication method comparing a correlation value between inspected characteristic data of a biometric subject acquired from the biometric subject being inspected and comparative data linked with a predetermined biometric subject and a predetermined threshold value linked with the predetermined biometric subject to authenticate whether or not the biometric subject being inspected is the predetermined biometric subject, including: a first step of determining a threshold value so that a value obtained by dividing an absolute value of a difference between a first mean value of a plurality of first correlation values generated by detecting correlation with the comparative data for a plurality of first characteristic data previously acquired from the predetermined biometric subject and the threshold value by a standard deviation of the plurality of first correlation values and values obtained by dividing an absolute value of a difference between a second mean value of a plurality of second correlation values generated by detecting correlation with the comparative data for a plurality of second characteristic data previously acquired from a biometric subject other than the predetermined biometric subject and the threshold value by the plurality of second correlation values coincide; and a second step of authenticating whether or not the biometric subject being inspected is the predetermined biometric subject by comparing the inspected characteristic data and the threshold value determined at the first step.

An authentication system of a third aspect of the invention is an authentication system comparing a correlation value between inspected characteristic data of a biometric subject acquired from the biometric subject being inspected and comparative data linked with a predetermined biometric subject and a predetermined threshold value linked with the predetermined biometric subject to authenticate whether or not the biometric subject being inspected is the predetermined biometric subject, including: an inputting means for inputting a false rejection rate showing a probability of certifying that the biometric subject being inspected who is the predetermined biometric subject is not the predetermined biometric subject; a threshold value determining means for determining the threshold value so as to satisfy the false rejection rate input by the inputting means by assuming that a plurality of correlation values generated by detecting correlation with the comparative data for the plurality of characteristic data previously acquired from the predetermined biometric subject are according to a normal profile; and an authenticating means for authenticating whether or not the biometric subject being inspected is the predetermined biometric subject by comparing the correlation value of the inspected characteristic data and the comparative data and the threshold value determined by the threshold value determining means.

A mode of operation of the authentication system of the third aspect of the invention is as follows.

The inputting means inputs a false rejection rate showing the probability of certifying that a biometric subject being inspected which is the predetermined biometric subject is not the predetermined biometric subject.

Next, the threshold value determining means determines the threshold value so as to satisfy the false rejection rate input by the inputting means by assuming that a plurality of correlation values generated by detecting correlation with the comparative data for the plurality of characteristic data previously acquired from the predetermined biometric subject are according to a normal profile.

Next, the authenticating means authenticates whether or not the biometric subject being inspected is the predetermined biometric subject by comparing the correlation value of the inspected characteristic data and the comparative data and the threshold value determined by the threshold value determining means.

An authentication method of a fourth aspect of the invention is an authentication method comparing a correlation value between inspected characteristic data of a biometric subject acquired from the biometric subject being inspected and comparative data linked with a predetermined biometric subject and a predetermined threshold value linked with the predetermined biometric subject to authenticate whether or not the biometric subject being inspected is the predetermined biometric subject, including: a first step of inputting a false rejection rate showing the probability of certifying that the biometric subject being inspected which is the predetermined biometric subject is not the predetermined biometric subject; a second step of determining the threshold value so as to satisfy the false rejection rate input in the first step by assuming that a plurality of correlation values generated by detecting correlation with the comparative data for the plurality of characteristic data previously acquired from the predetermined biometric subject are according to a normal profile; and a third step of authenticating whether or not the biometric subject being inspected is the predetermined biometric subject by comparing the correlation value of the inspected characteristic data and the comparative data and the threshold value determined in the second step.

An authentication system of a fifth aspect of the invention is an authentication system comparing a correlation value between inspected characteristic data of a biometric subject acquired from the biometric subject being inspected and comparative data linked with a predetermined biometric subject and a predetermined threshold value linked with the predetermined biometric subject to authenticate whether or not the biometric subject being inspected is the predetermined biometric subject, including: an inputting means for inputting a false acceptance rate showing the probability of certifying that the biometric subject being inspected who is not the predetermined biometric subject is the predetermined biometric subject; a threshold value determining means for determining the threshold value so as to satisfy the false acceptance rate input by the inputting means by assuming that a plurality of correlation values generated by detecting correlation with the comparative data for the plurality of characteristic data previously acquired from the predetermined biometric subject are according to a normal profile; and an authenticating means for authenticating whether or not the biometric subject being inspected is the predetermined biometric subject by comparing the correlation value of the inspected characteristic data and the comparative data and the threshold value determined by the threshold value determining means.

A mode of operation of the authentication system of the fifth aspect of the invention is as follows.

The inputting means inputs a false acceptance rate showing the probability of certifying that a biometric subject being inspected which is not a predetermined biometric subject is the predetermined biometric subject.

Next, the threshold value determining means determines the threshold value so as to satisfy the false acceptance rate input by the inputting means by assuming that a plurality of correlation values generated by detecting correlation with the comparative data for the plurality of characteristic data previously acquired from the predetermined biometric subject are according to a normal profile.

Next, the authenticating means compares a correlation value of the inspected characteristic data and the comparative data and the threshold value determined by the threshold value determining means to authenticate whether or not the biometric subject being inspected is the predetermined biometric subject.

An authentication method of a sixth aspect of the invention is an authentication method for comparing a correlation value between inspected characteristic data of a biometric subject acquired from the biometric subject being inspected and comparative data linked with a predetermined biometric subject and a predetermined threshold value linked with the predetermined biometric subject to authenticate whether or not the biometric subject being inspected is the predetermined biometric subject, including: a first step of inputting a false acceptance rate showing the probability of certifying that the biometric subject being inspected which is not the predetermined biometric subject is the predetermined biometric subject; a second step of determining the threshold value so as to satisfy the false acceptance rate input in the first step by assuming that a plurality of correlation values generated by detecting correlation with the comparative data for the plurality of characteristic data previously acquired from the predetermined biometric subject are according to a normal profile; and a third step of authenticating whether or not the biometric subject being inspected is the predetermined biometric subject by comparing the correlation values of the inspected characteristic data and the comparative data and the threshold value determined in the second step.

According to the first and second aspects of the invention, an authentication system and the authentication method able to perform authentication with a higher reliability in comparison with the conventional ones can be provided.

According to the third to sixth aspects of the invention, authentication systems and the authentication methods able to realize an input false acceptance rate or a false rejection rate can be provided.

Additional features and advantages of the present invention are described in, and will be apparent from, the following Detailed Description and the Figures.

BRIEF DESCRIPTION OF THE FIGURES

FIG. 15 is a diagram for explaining a normal profile table data TABLE stored in a memory shown in FIG. 13.

DESCRIPTION OF NOTATIONS

10 . . . biometric subject, 12 . . . biometric data reading unit, 14 . . . characteristic extraction unit, 16 . . . correlation value calculation unit, 18 . . . memory, 20 . . . authentication unit, 22, 122, 222 . . . threshold value determination unit, 221 . . . input unit, TP . . . true profile, OP, OPA . . . other profile, FAR . . . false acceptance rate, FRR . . . false rejection rate.

DETAILED DESCRIPTION

Below, authentication systems according to embodiments of the present invention will be explained.

First Embodiment

Below, this embodiment will be explained with reference to FIG. 1 to FIG. 3.

First, the correspondence between components of the present embodiment and components of the present invention will be explained.

A memory 18 corresponds to the storing means of the first aspect of the invention, an authentication unit 20 corresponds to the authenticating means of the first aspect of the invention, and a threshold value determination unit 22 corresponds to the threshold value determining means of the first aspect of the invention.

True person sample data $Ct1$ to $Ctn$ correspond to the first characteristic data of the first aspect of the invention, other sample data $Co1$ to $Com$ correspond to the second characteristic data of the first aspect of the invention, correlation data Ft correspond to the first correlation values of the first aspect of the invention, and correlation data Fo correspond to the second correlation values of the first aspect of the invention.

Further, a mean value $\mu t$ corresponds to the first mean value of the first aspect of the invention, and a mean value $\mu o$ corresponds to the second mean value of the first aspect of the invention.

Further, a threshold value Xth corresponds to the threshold value of the first aspect of the invention.

Figure 1:
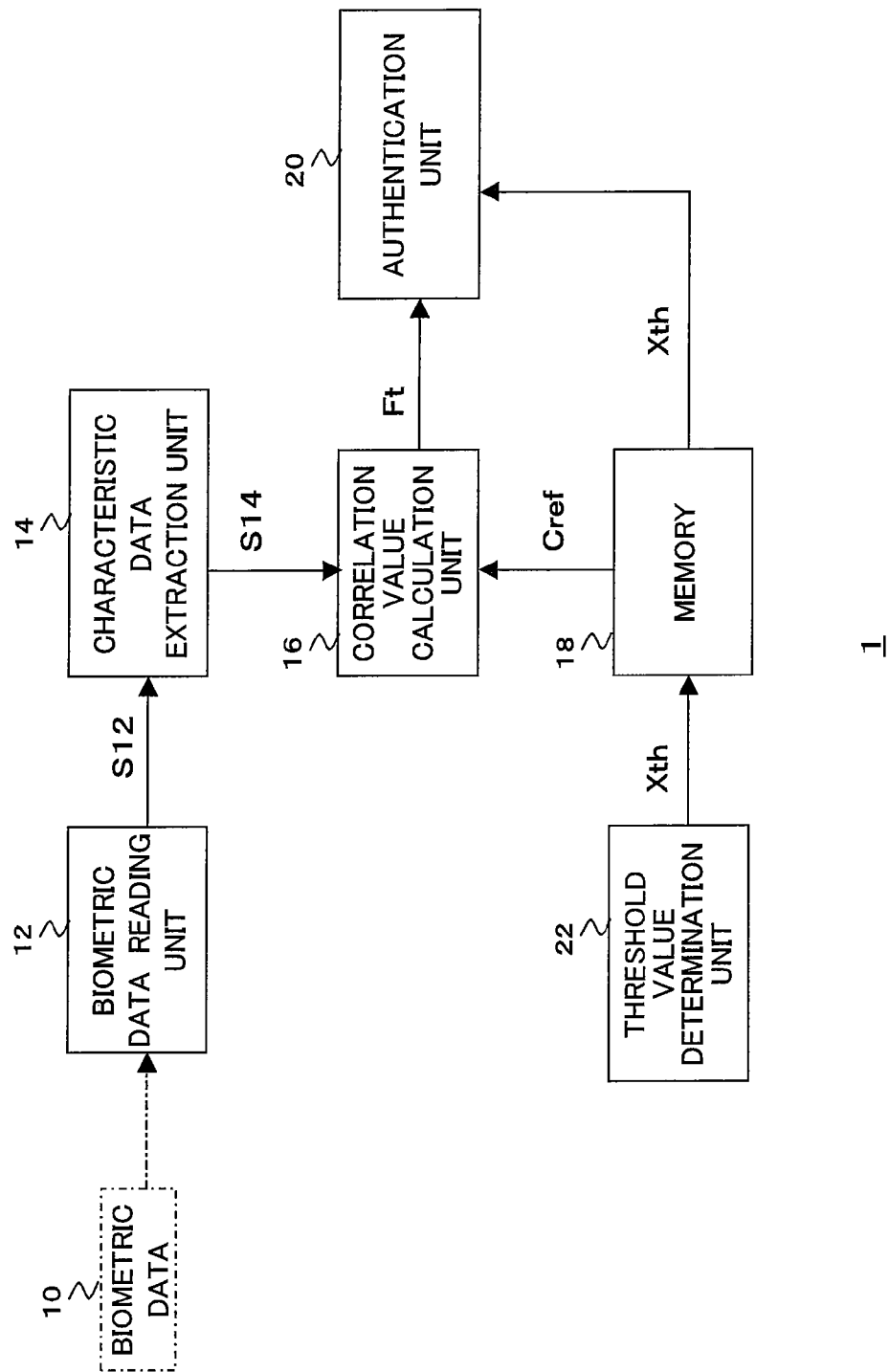
FIG. 1 is a view of the overall configuration of an authentication system of a first embodiment of the present invention.

FIG. 1 is a view of the configuration of an authentication system 1 according to an embodiment of the present invention.

As shown in FIG. 1, the authentication system 1 has for example a biometric data reading unit 12, characteristic extraction unit 14, correlation value calculation unit 16, memory 18, authentication unit 20, and threshold value determination unit 22.

The characteristic extraction unit 14, correlation value calculation unit 16, memory 18, authentication unit 20, and threshold value determination unit 22 are realized by executing a program by dedicated hardware such as an electronic circuit or processing circuit.

The biometric data reading unit 12 reads for example the fingerprint or vein pattern or other the biometric data from a human finger or other biometric subject 10 and outputs the related read biometric data S12 to the characteristic extraction unit 14.

The characteristic extraction unit 14 extracts inspected characteristic data S14 showing a characteristic feature such as a branch point and end point of a fingerprint and vein pattern from the biometric data S12 input from the biometric data reading unit 12 and outputs this to the correlation value calculation unit 16.

The correlation value calculation unit 16 detects correlation data Ft indicating the correlation value of the inspected characteristic data S14 input from the characteristic extraction unit 14 and the reference characteristic data Cref read out from the memory 18 and outputs this to the authentication unit 20.

The memory 18 stores the reference characteristic data Cref and a threshold value Xth written from the threshold value determination unit 22.

The authentication unit 20 judges whether or not the correlation value indicated by the correlation data Ft input from the correlation value calculation unit 16 is larger than the threshold value Xth, certifies that the biometric subject 10 is legitimate when judging that the correlation value is larger, and certifies that the biometric subject 10 is not legitimate when not judging so.

The threshold value determination unit 22 calculates the threshold value Xth as explained below based on the true sample data $Ct1$ to $Ctn$ of the characteristic data previously acquired from the biometric subject 10 a plurality of times and the other sample data $Co1$ to $Com$ of the characteristic data previously acquired from a biometric subject other than the biometric subject 10 (other person) a plurality of times and writes this into the memory 18.

Figure 2:
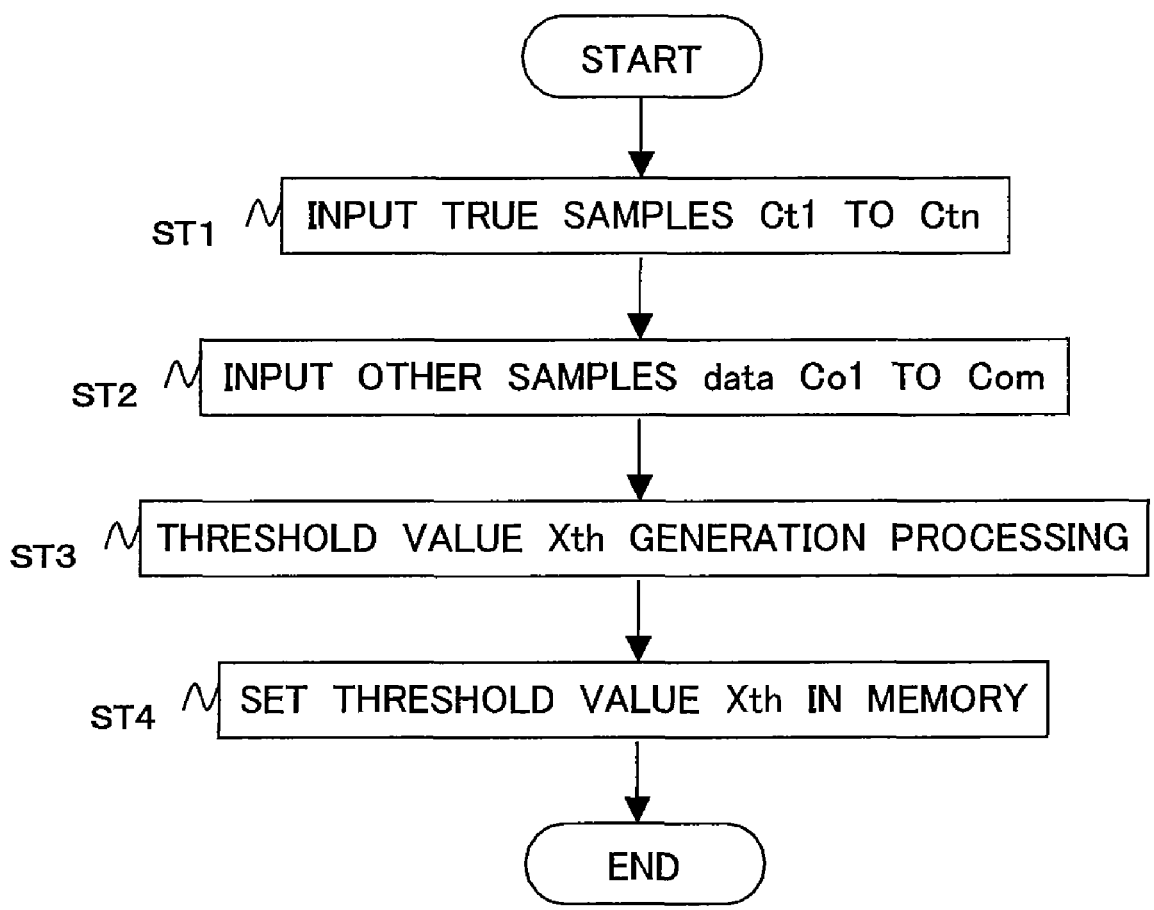
FIG. 2 is a flow chart for explaining processing of a threshold value determination unit shown in FIG. 1.

FIG. 2 is a flow chart for explaining the processing of the threshold value determination unit 22 shown in FIG. 1.

Step ST1:
The threshold value determination unit 22 receives as input the true sample data Ct1 to Ctn from another apparatus via the memory 18 or the network etc.

Step ST2:
The threshold value determination unit 22 receives as input the other sample data Co1 to Com from another apparatus via the memory 18 or the network etc.

Step ST3:
The threshold value determination unit 22 calculates the threshold value Xth based on the true sample data Ct1 to Ctn input at step ST1 and the other sample data Co1 to Com input at step ST2.

Step ST4:
The threshold value determination unit 22 writes (sets) the threshold value Xth calculated at step ST3 in the memory 18.

Below, step ST3 shown in FIG. 2 will be explained in detail.

Figure 3:
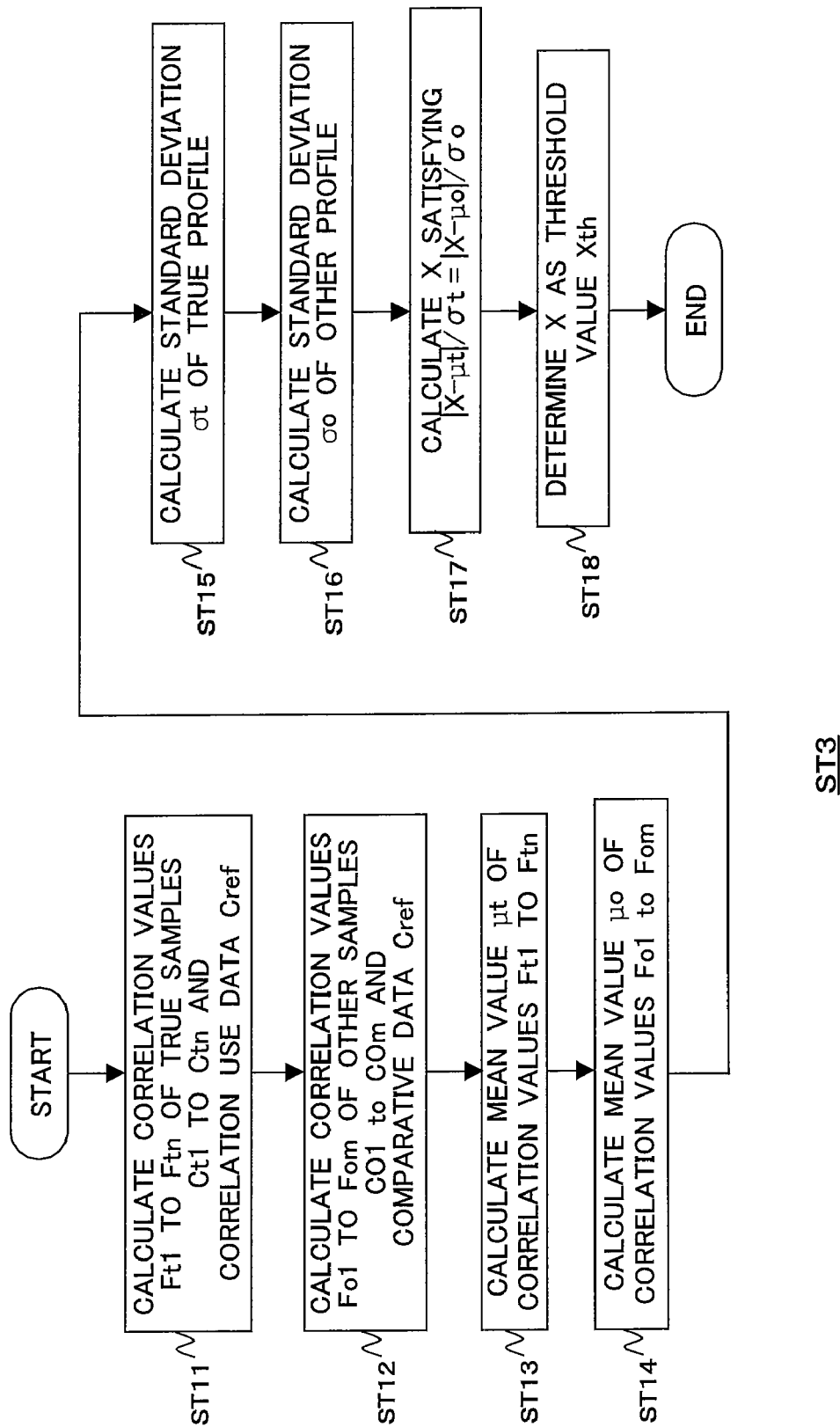
FIG. 3 is a flow chart for explaining the processing of step ST3 shown in FIG. 2.

FIG. 3 is a flow chart for explaining step ST3 shown in FIG. 2.

Step ST11:
The threshold value determination unit 22 calculates correlation data Ft1 to Ftn indicating correlation values with the reference characteristic data Cref read out from the memory 18 for each of the true sample data Ct1 to Ctn input at step ST1 shown in FIG. 2.

Step ST12:
The threshold value determination unit 22 calculates correlation data Fo1 to Fom indicating correlation values with the reference characteristic data Cref read out from the memory 18 for each of the other sample data Co1 to Com input at step ST2 shown in FIG. 2.

Step ST13:
The threshold value determination unit 22 calculates the mean value $\mu t$ of n number of correlation data Ft1 to Ftn calculated at step ST11.

Step ST14:
The threshold value determination unit 22 calculates the mean value $\mu o$ of m number of correlation data Fo1 to Fom calculated at step ST12.

Step ST15:
The threshold value determination unit 22 calculates the standard deviation $\sigma t$ of the correlation data for the true person based on the following equation (1) based on the correlation data Ft1 to Ftn calculated at step ST11 and the mean value $\mu t$ calculated at step ST13.

[Equation 1]

$$\sigma t = \sqrt{\frac{1}{n}\sum_{i=1}^{n}(Fti - \mu t)^2} \quad (1)$$

Step ST16:
The threshold value determination unit 22 calculates the standard deviation $\sigma o$ of the correlation data for the other person based on the following equation (2) based on the correlation data Fo1 to Fom calculated at step ST12 and the mean value $\mu o$ calculated at step ST14.

[Equation 2]

$$\sigma o = \sqrt{\frac{1}{m}\sum_{i=1}^{m}(Foi - \mu o)^2} \quad (2)$$

Step ST17:
The threshold value determination unit 22 calculates a value X satisfying the following equation (3) based on the mean value $\mu t$ calculated at step ST13 and the standard deviation $\sigma t$ calculated at step ST15.

Note that, in the following equation (3), the left side indicates a Mahalanobis distance according to the true profile, and the right side indicates the Mahalanobis distance according to the other profile.

When the following equation (4) is satisfied, the following equation (3) becomes like the following equation (5) and further can be modified as in the following equations (6) and (7).

Accordingly, the threshold value determination unit 22 calculates the value X based on the following equation (7).

[Equation 3]

$$\frac{|X - \mu t|}{\sigma t} = \frac{|X - \mu o|}{\sigma o} \quad (3)$$

[Equation 4]

$$\mu t > \mu o \quad (4)$$

[Equation 5]

$$\frac{\mu t - X}{\sigma t} = \frac{X - \mu o}{\sigma o} \quad (5)$$

[Equation 6]

$$\sigma o(\mu t - X) = \sigma t(X - \mu o) \quad (6)$$

[Equation 7]

$$X = \frac{\sigma o \mu t + \sigma t \mu o}{\sigma t + \sigma o} \quad (7)$$

Step ST18:
The threshold value determination unit 22 modifies the value X calculated at step ST17 to the threshold value Xth.

Namely, the threshold value determination unit 22 assumes that the true profile defined by the correlation data Ft1 to Ftn and the other profile defined by the correlation data Fo1 to Fom are normal profiles and calculates the threshold value Xth based on the mean values $\mu t$ and $\mu o$ and standard deviations $\sigma t$ and $\sigma o$ of these.

Below, the operation of the authentication system 1 shown in FIG. 1 will be explained.

The threshold value determination unit 22 shown in FIG. 1 generates the threshold value Xth as explained by using FIG. 2 and FIG. 3 and writes this into the memory 18.

At the time of the inspection, the biometric data reading unit 12 reads biometric data such as a fingerprint or vein pattern from a human finger or other biometric subject 10 and outputs the read biometric data S12 to the characteristic extraction unit 14.

Next, the characteristic extraction unit 14 extracts the inspected characteristic data S14 indicating a characteristic feature such as a branch point or end point of a fingerprint or vein pattern from the biometric data S12 input from the biometric data reading unit 12 and outputs this to the correlation value calculation unit 16.

Next, the correlation value calculation unit 16 detects the correlation data Ft indicating the correlation value of the inspected characteristic data S14 input from the characteristic extraction unit 14 and the reference characteristic data Cref read out from the memory 18 and outputs this to the authentication unit 20.

Next, the authentication unit 20 judges whether or not the correlation value indicated by the correlation data Ft input from the correlation value calculation unit 16 is larger than the threshold value Xth, certifies that the biometric subject 10 is legitimate when judging that the correlation value is larger, and certifies that the biometric subject 10 is not legitimate when not judging so.

As explained above, according to the authentication system 1, the threshold value determination unit 22, as shown at step ST17 shown in FIG. 3 and above equation (3), determines the threshold value Xth (X) so that it indicates the Mahalanobis distance according to the true profile and it coincides with the Mahalanobis distance according to the other profile.

Due to this, the false acceptance rate FAR and the false rejection rate FRR can be made to schematically coincide and balanced high precision authentication can be performed.

Second Embodiment

In the present embodiment, the true profile TP corresponds to the first normal profile of the first aspect of the invention, the other profile OP corresponds to the second normal profile of the first aspect of the invention, and the deformed other profile corresponds to the third normal profile of the first aspect of the invention.

In the above first embodiment, the threshold value determination unit 22 calculated the mean value μo and the standard deviation σo by using the other profile defined according to the correlation data Fo1 to Fom as it was.

In the present embodiment, the other profile is deformed by using the skewness, calculates the mean value μo and the standard deviation σo based on the deformed other profile, and stably suppresses the FAR/FRR low.

Figure 4B:
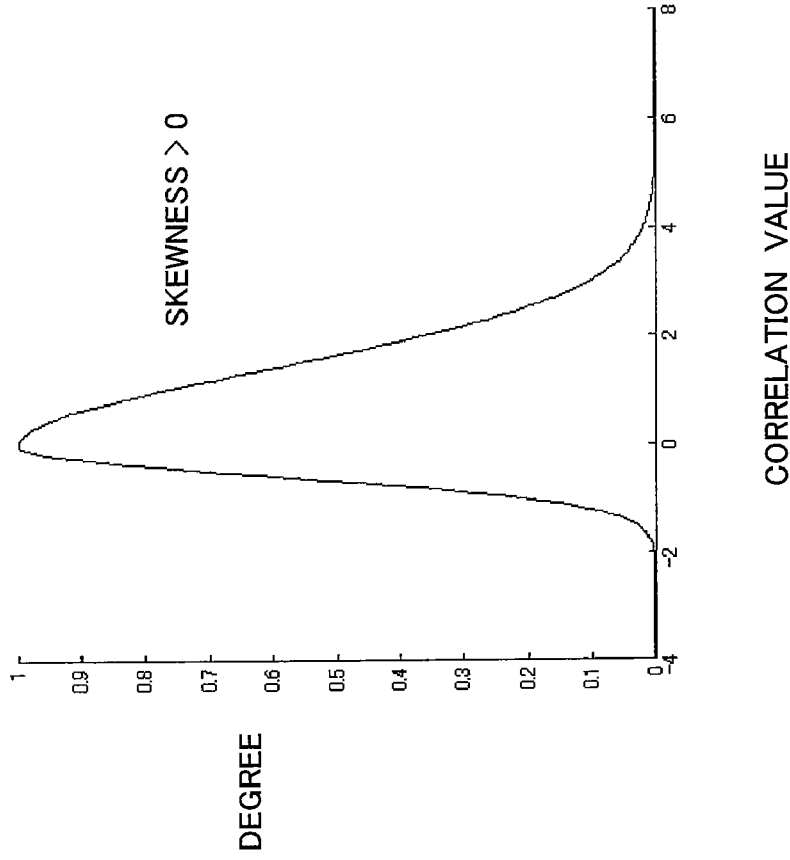
FIG. 4 is a diagram for explaining characteristics of another profile.
Figure 4A:
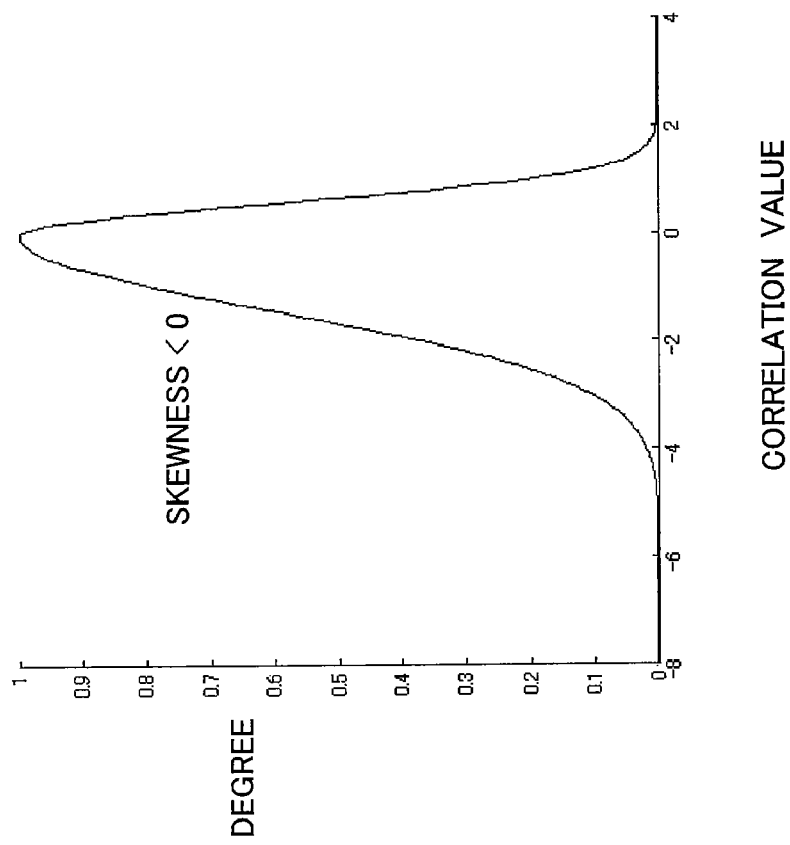

Here, the skewness is the value expressing the left and right symmetry of the profile, becomes zero in the case of the left and right symmetry as in the normal profile, becomes the profile biased to the right as shown in for example FIG. 4A in the case of a negative value, and becomes the profile biased to the left as shown in for example FIG. 4B in the case of a positive value, and the spread of the profile becomes the inverse direction thereof.

Here, when the mean value of m correlation data Fo1 to Fom is Fave and a non-biased dispersion is v, the skewness Sk becomes as in the following equation (8).

[Equation 8]

$$sk = \frac{\sum_{i=1}^{n}(Foi - F_{AVE})^3}{nv^{1.5}} \quad (8)$$

First, the case where the other profile OP is biased to the right with reference to FIG. 5 will be explained.

Figure 5:
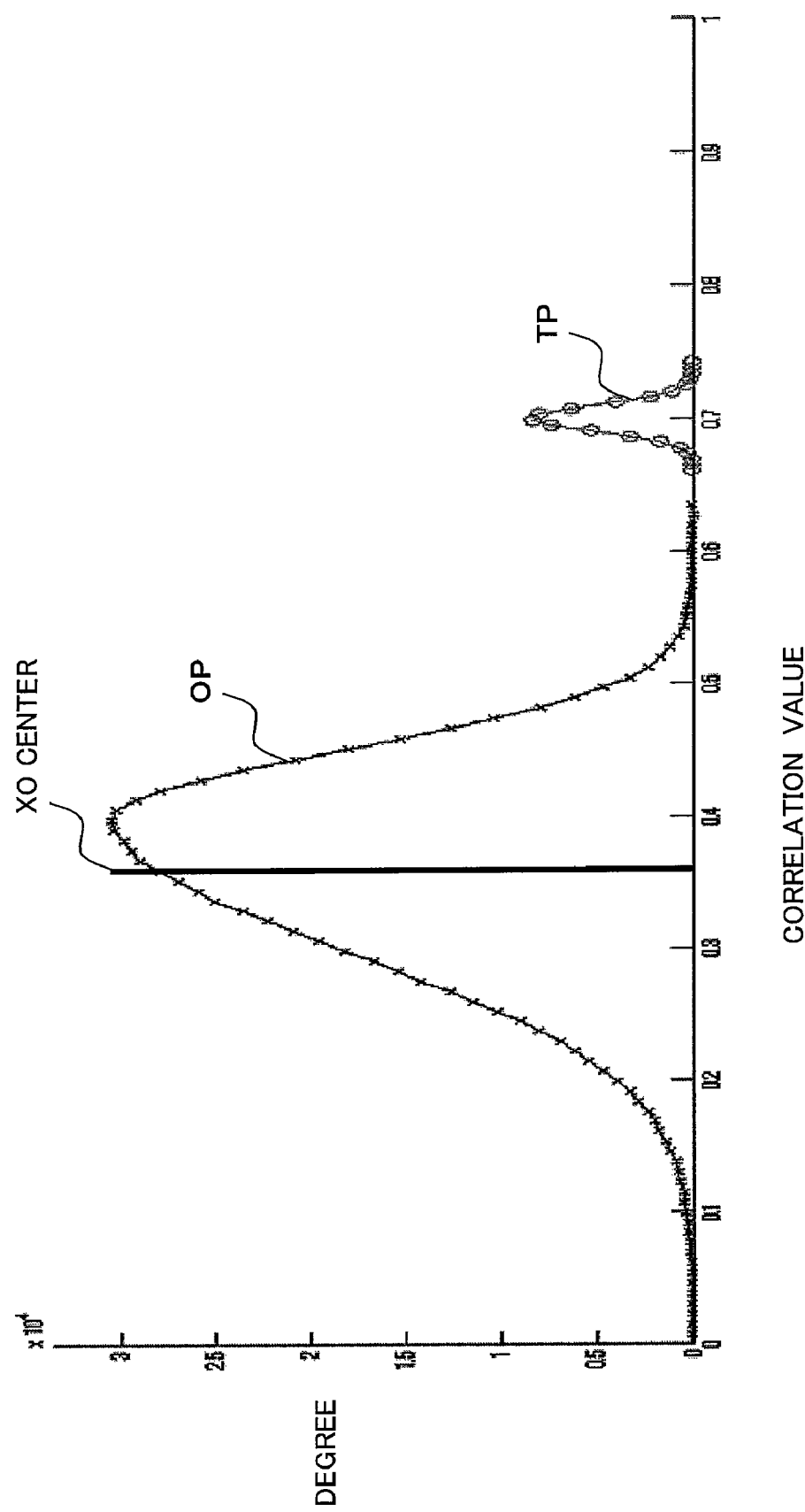
FIG. 5 is a diagram for explaining characteristics of another profile where a skewness is negative.

For example, when performing personal authentication based on the true profile TP and the other profile OP shown in FIG. 5, when considering at which position to take the threshold value for distinguishing the true person and the other person, the Mahalanobis distance from the center OP_C of the other profile OP is used, but as shown in FIG. 5, when the other profile OP has a biased profile, it becomes possible to lower the FAR without raising the FRR by utilizing that eccentricity.

As seen from FIG. 5, the frequency is sharply lowered on the right side from the profile center of the other profile OP and there is no spread of the profile. On the other hand, on the left side, the frequency gently falls in comparison with the right side and also the spread of profile is large. In the conventional case, the standard deviation of the other profile OP is calculated by using these left and right data, but in confirming the true property, by using only the data on the true side, that is, the sharply changing data, to calculate the standard deviation again, it becomes possible to obtain the true side other profile data in a conscious form. In the case of a profile inclined to the true side (right) in this way, the skewness becomes negative.

Figure 6:
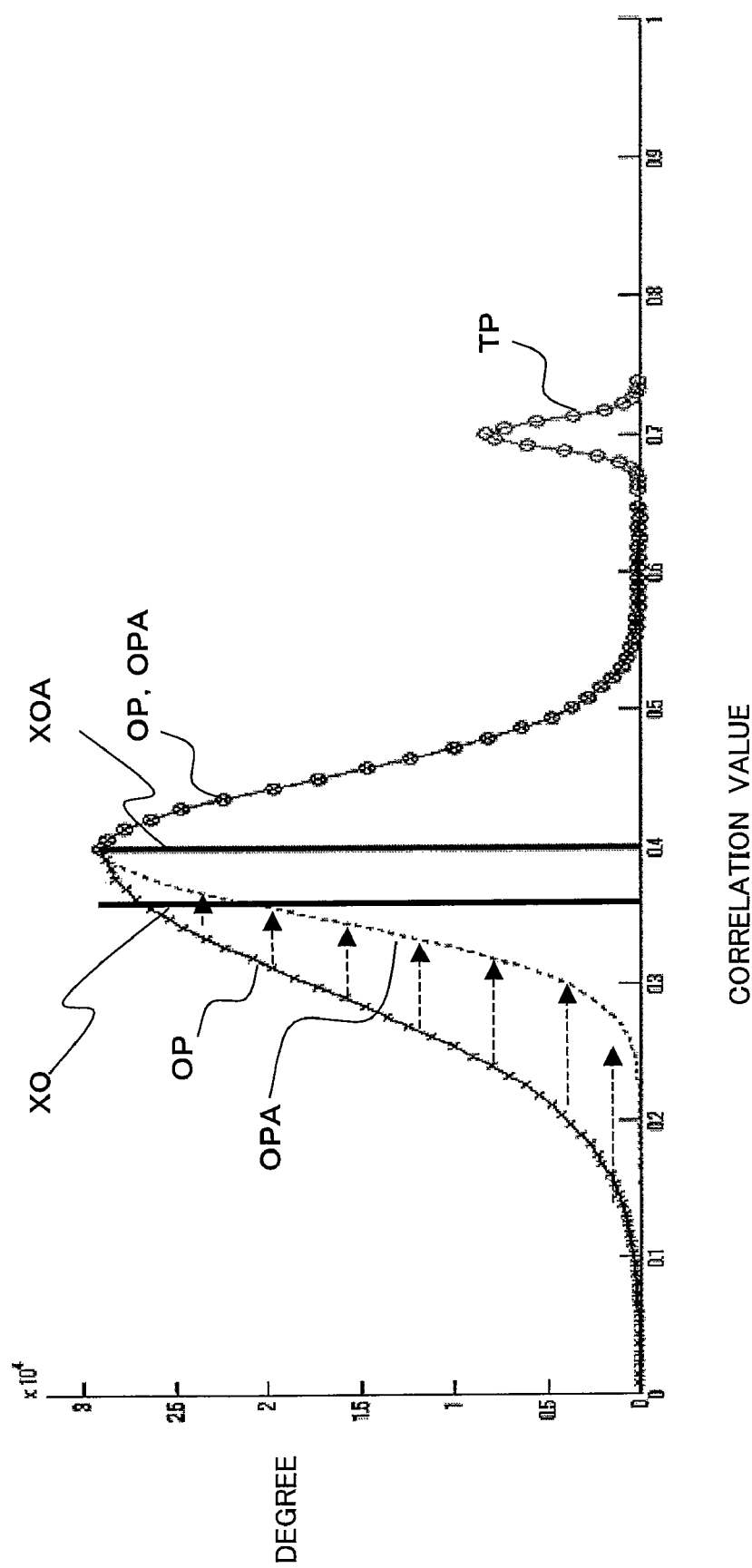
FIG. 6 is a diagram for explaining characteristics of a deformed other profile where the skewness is negative.

First, consider the case where the skewness is negative. When using only the spread on the true side of the other profile OP and reform the other profile OP again considering another person with respect to the true person, the profile becomes like the other profile OPA shown in FIG. 6. Note that, the center of the other profile OP on the true side is set at a position where the degree of the other profile becomes the maximum value.

Accordingly, when the data composing the other profile OP is xi (i=1 to m) and the data composing the data composing the other profile on the true side is xj (j=1 to s), the profile σc² is indicated by the following equation (9).

[Equation 9]

$$\sigma c^2 = \frac{\sum_{j=1}^{s}(xj - \bar{x}c)^2}{s} \quad (9)$$

Figure 7:
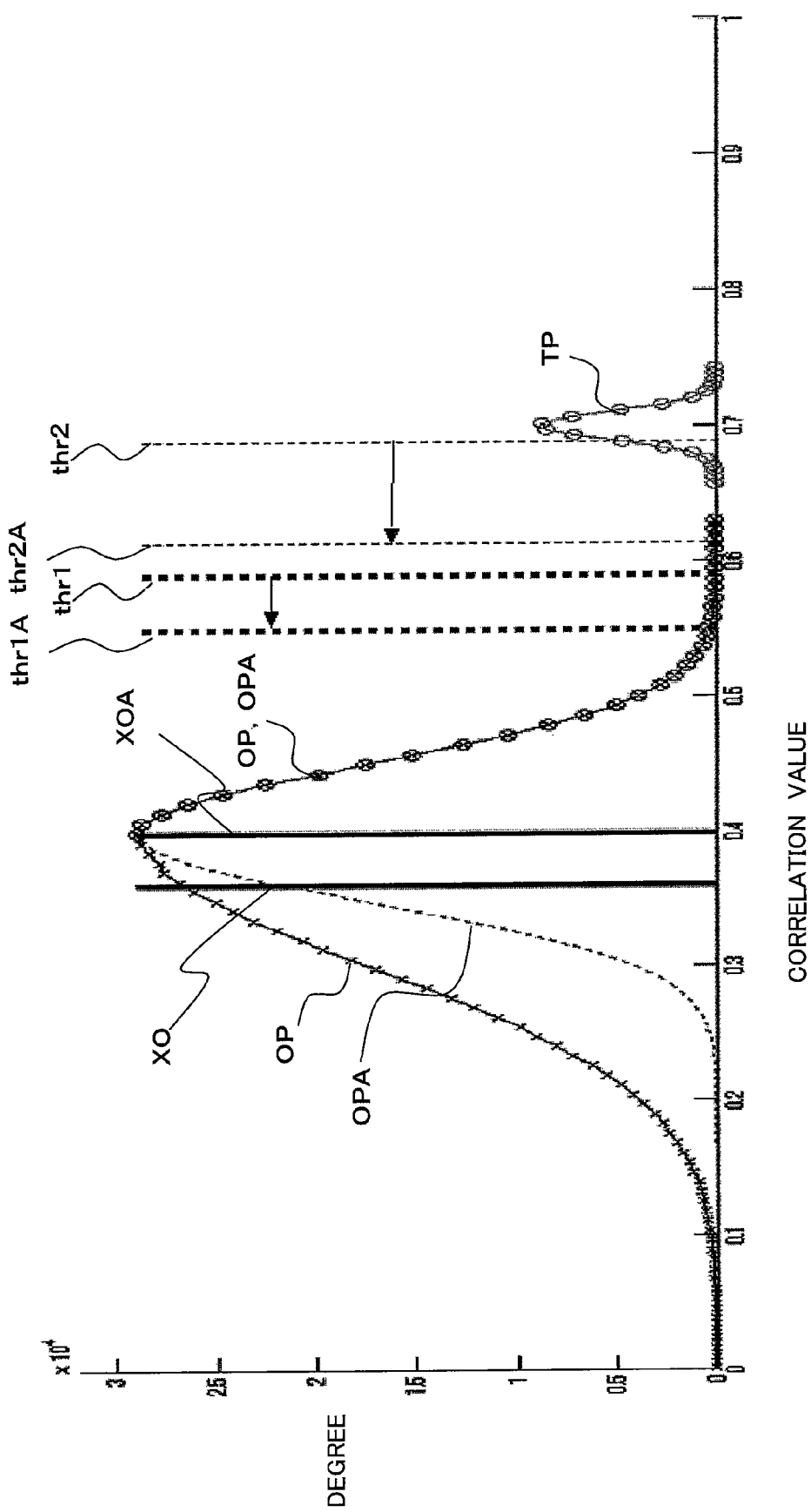
FIG. 7 is a diagram for explaining a threshold value when using a deformed other profile where the skewness is negative.

When viewing the other profile OP and the distance of the true profile TP from the deformed other profile OPA by using the standard deviation as a measure, they become as shown in FIG. 7.

In FIG. 7, consider the change of the threshold value according to the Mahalanobis distance by using the above deformed other profile OPA.

In FIG. 7, a threshold value thr1 indicates the distance 3 times the standard deviation from the center of the other profile and a threshold value thr2 indicates the distance 4.27 times the standard deviation from the profile center of the other person.

When using the threshold value thr2, the FAR becomes 0.001% when converted from the normal profile table.

When using the threshold value thr2 defined based on the other profile OP, the threshold value thr2 fully enters into the true profile and the false rejection rate FRR becomes relatively large. On the other hand, when determining the threshold value thr2 based on the deformed other profile OPA, the false rejection rate FRR can be sufficiently lowered with almost no rise of the false acceptance rate FAR.

Next, the case where the other profile OP is biased to the left will be explained with reference to FIG. 8.

Figure 8:
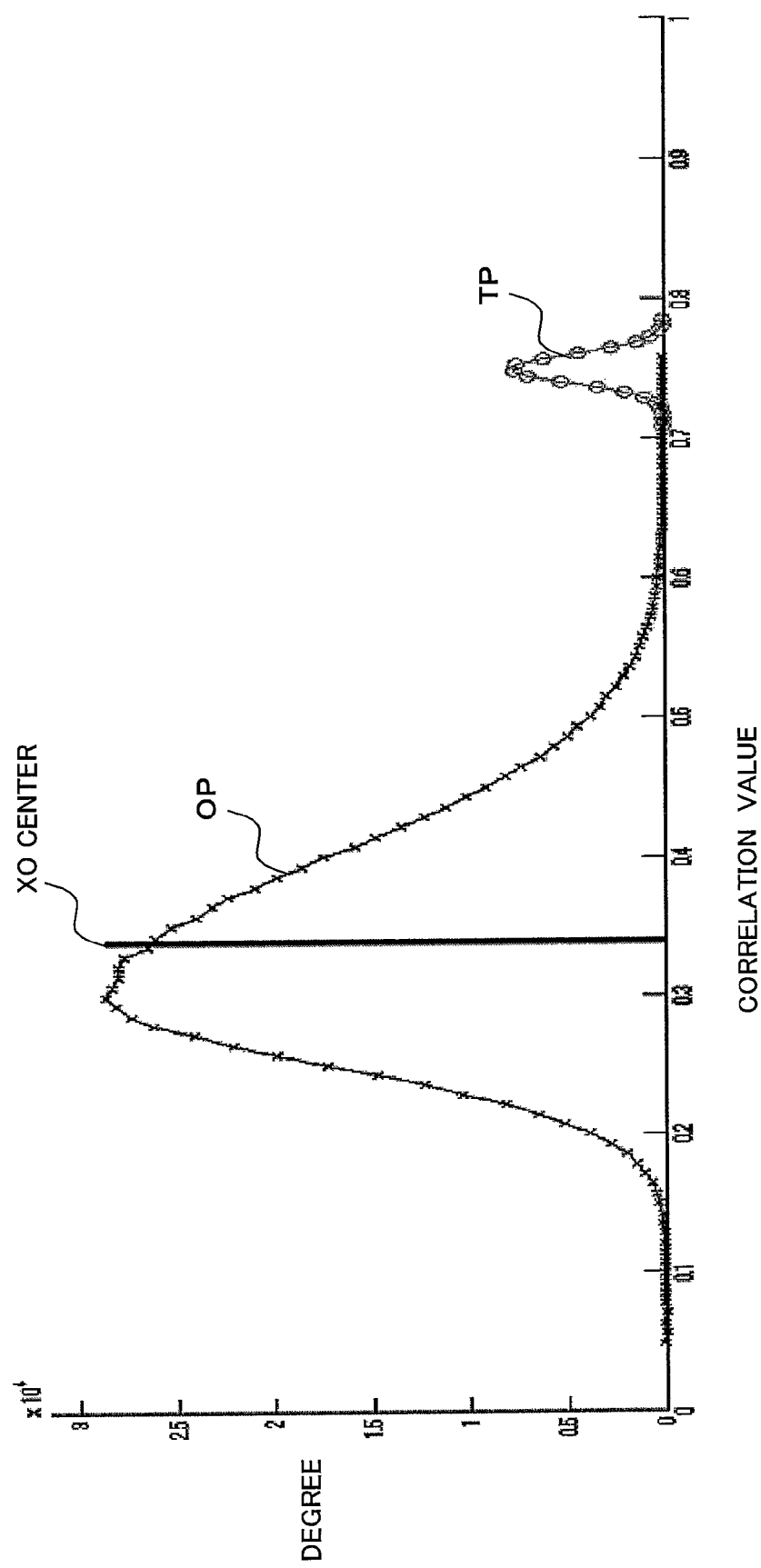
FIG. 8 is a diagram for explaining characteristics of another profile where the skewness is positive.
Figure 9:
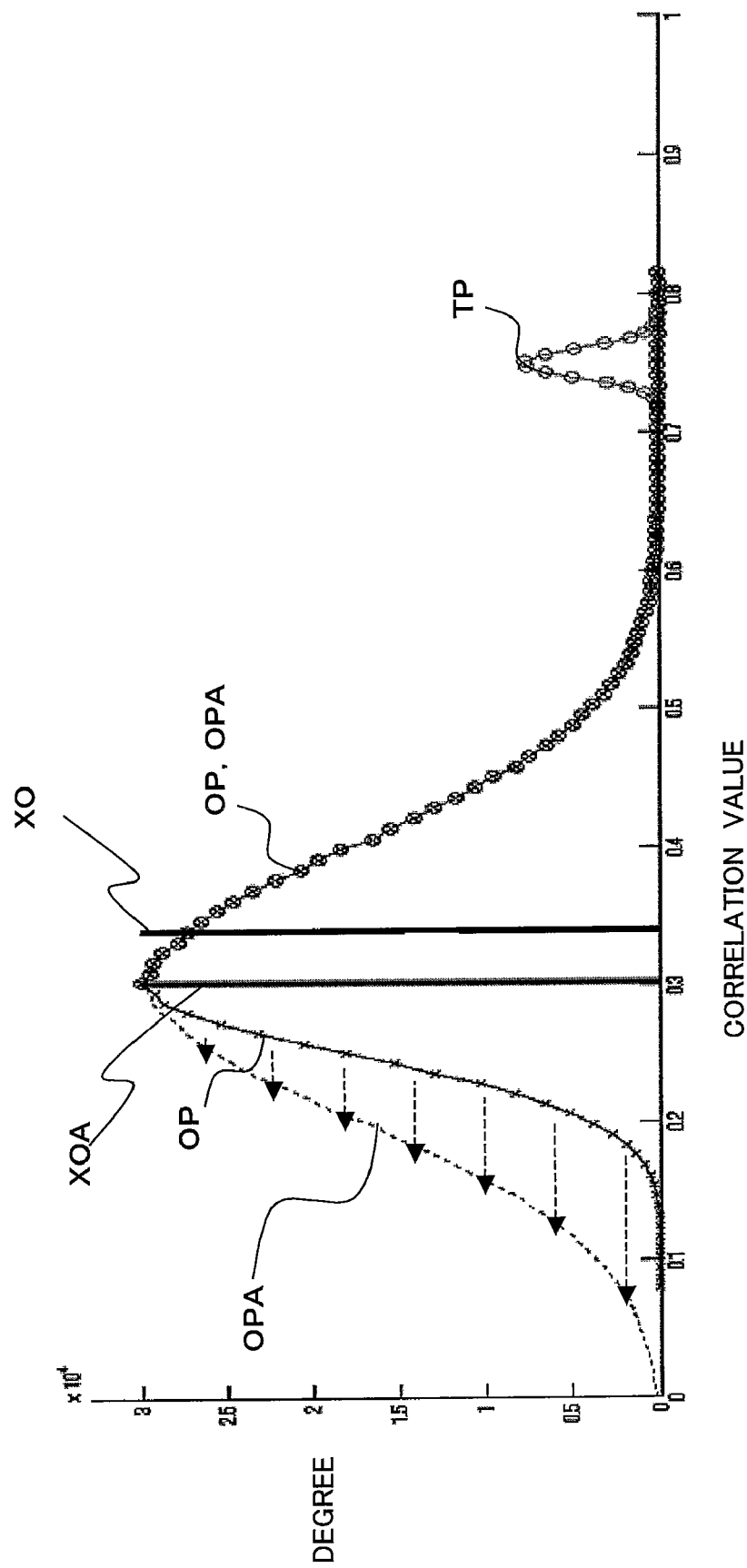
FIG. 9 is a diagram for explaining characteristics of a deformed other profile where the skewness is positive.

For example, when using only the spread on the true side of the other profile OP even in the case shown in FIG. 8 to reform the other profile OP again considering another person with respect to the true person, the profile becomes as in FIG. 9. Note that the center of the other profile OP on the true side is made the position where the degree of the other profile becomes the maximum value.

Then, when viewing the other profile OP and the distance of the true profile TP from the deformed other profile OPA by using the standard deviation as a measure, the profiles become as shown in FIG. 9.

In FIG. 9, consider the change of the threshold value according to the Mahalanobis distance by using the deformed other profile explained above.

Figure 10:
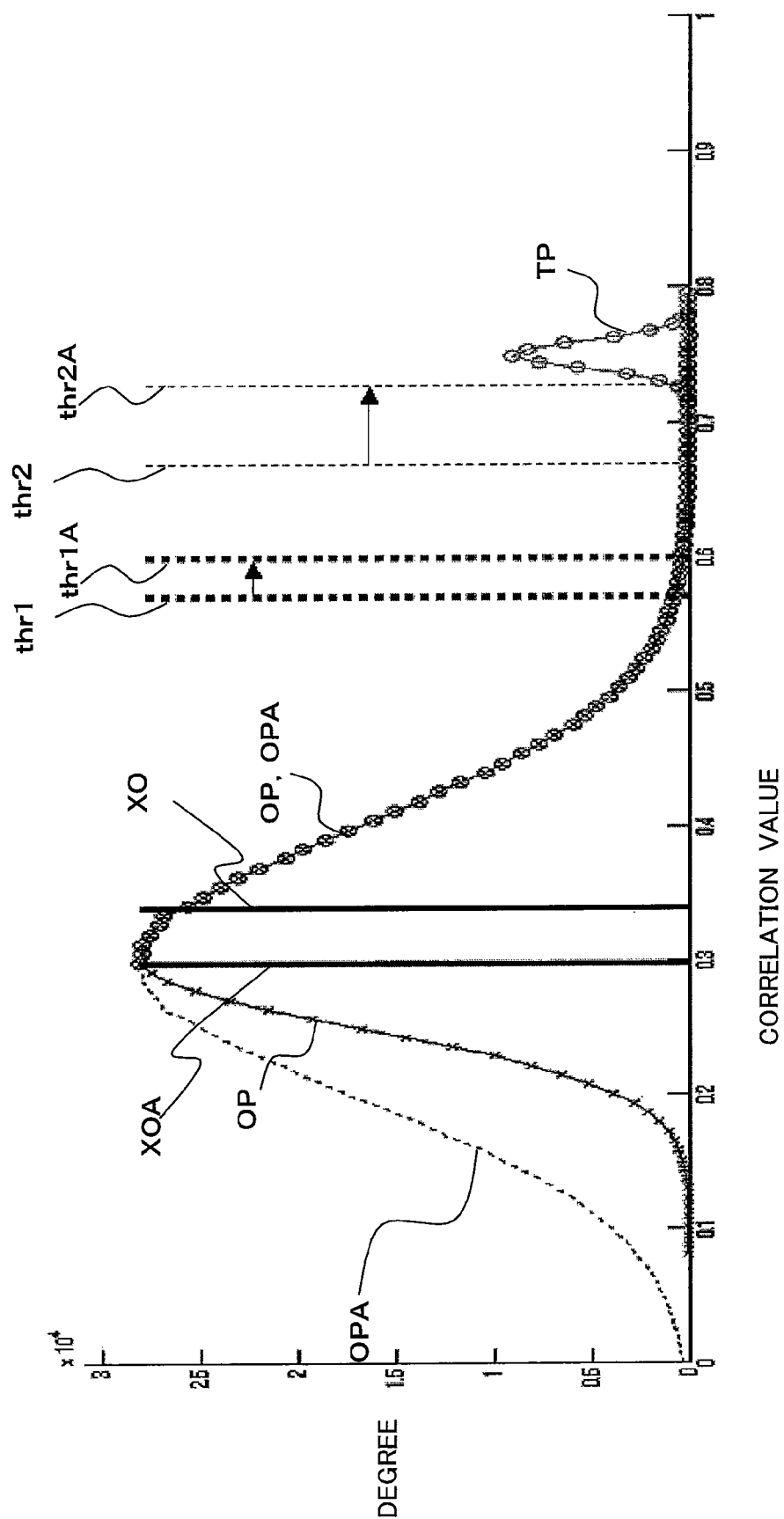
FIG. 10 is a diagram for explaining the threshold value when using a deformed other profile where the skewness is positive.

In FIG. 10, the threshold value thr1 indicates the distance 3 times the standard deviation from the center of the other profile, and the threshold value thr2 indicates the distance 4.27 times the standard deviation from the profile center of the other person.

When the threshold value thr2 is used, FAR becomes 0.001% when converted from the normal profile table.

When the threshold value thr2 defined based on the other profile OP is used, the threshold value thr2 is sufficiently apart from the true profile, and the false rejection rate FRR is sufficiently small. On the other hand, when the threshold value thr2A is determined based on the deformed other profile OPA, both of the false acceptance rate FAR and the false rejection rate FRR rise. That is, when the threshold value is determined by the whole profile, there is a worry of the set FAR and FRR insufficiently functioning. According to the present embodiment, the problem of a threshold value lower than the original threshold value being set and actually becoming an obstacle at the time of authentication can be solved.

Below, an authentication system 101 of the present embodiment for determining the threshold value Xth based on the other profile OPA obtained by deforming the other profile OP as explained above will be explained.

Figure 11:
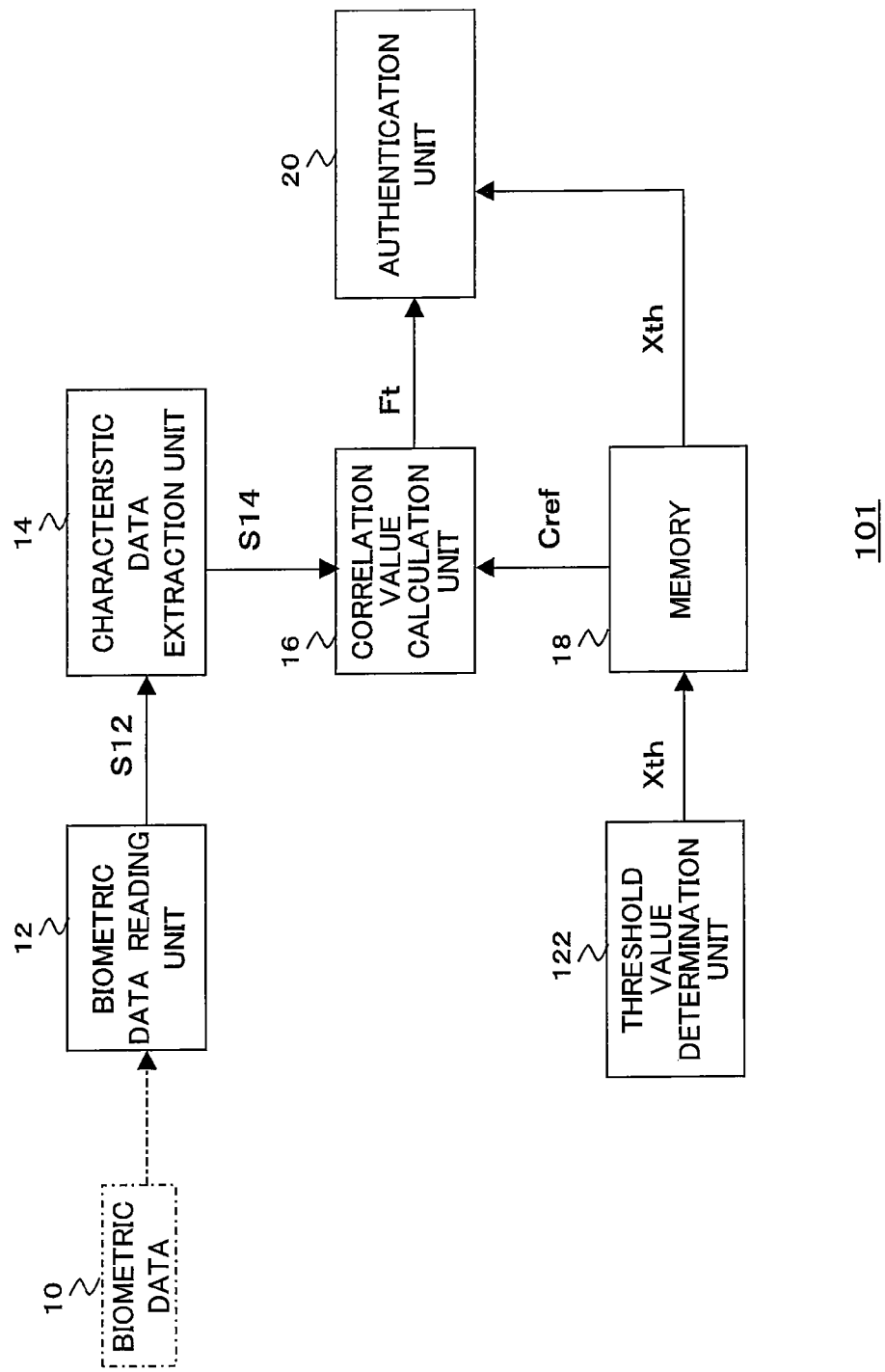
FIG. 11 is a view of the overall configuration of an authentication system of a second embodiment of the present invention.

FIG. 11 is a view of the configuration of the authentication system 101 according to the embodiment of the present invention.

As shown in FIG. 11, the authentication system 101 has for example a biometric data reading unit 12, characteristic extraction unit 14, correlation value calculation unit 16, memory 18, authentication unit 20, and threshold value determination unit 122.

In FIG. 11, parts given the same notations as those of FIG. 1 are the same as those explained in the first embodiment.

Namely, the authentication system 101 is different in the threshold value determination unit 122 from the threshold value determination unit 22 of the first embodiment.

The threshold value determination unit 122 is realized by running a program by dedicated hardware such as an electronic circuit or processing circuit.

Below, the threshold value determination unit 122 will be explained in detail.

The threshold value determination unit 122 calculates the threshold value Xth as will be explained below based on the true sample data Ct1 to Ctn of the characteristic data previously acquired from a biometric subject 10 a plurality of times and the other sample data Co1 to Com of the characteristic data previously acquired from a biometric subject other than the biometric subject 10 (other person) a plurality of times and writes this into the memory 18.

In this case, as explained by using FIG. 6, FIG. 7, FIG. 9, and FIG. 10, the threshold value determination unit 122 does not use the other sample data Co1 to Com as they are, but generates the other profile OPA which becomes linearly symmetric with the maximum degree about the other profile OP defined by the other sample data Co1 to Com and calculates the threshold value Xth by using this other profile OPA.

Figure 12:
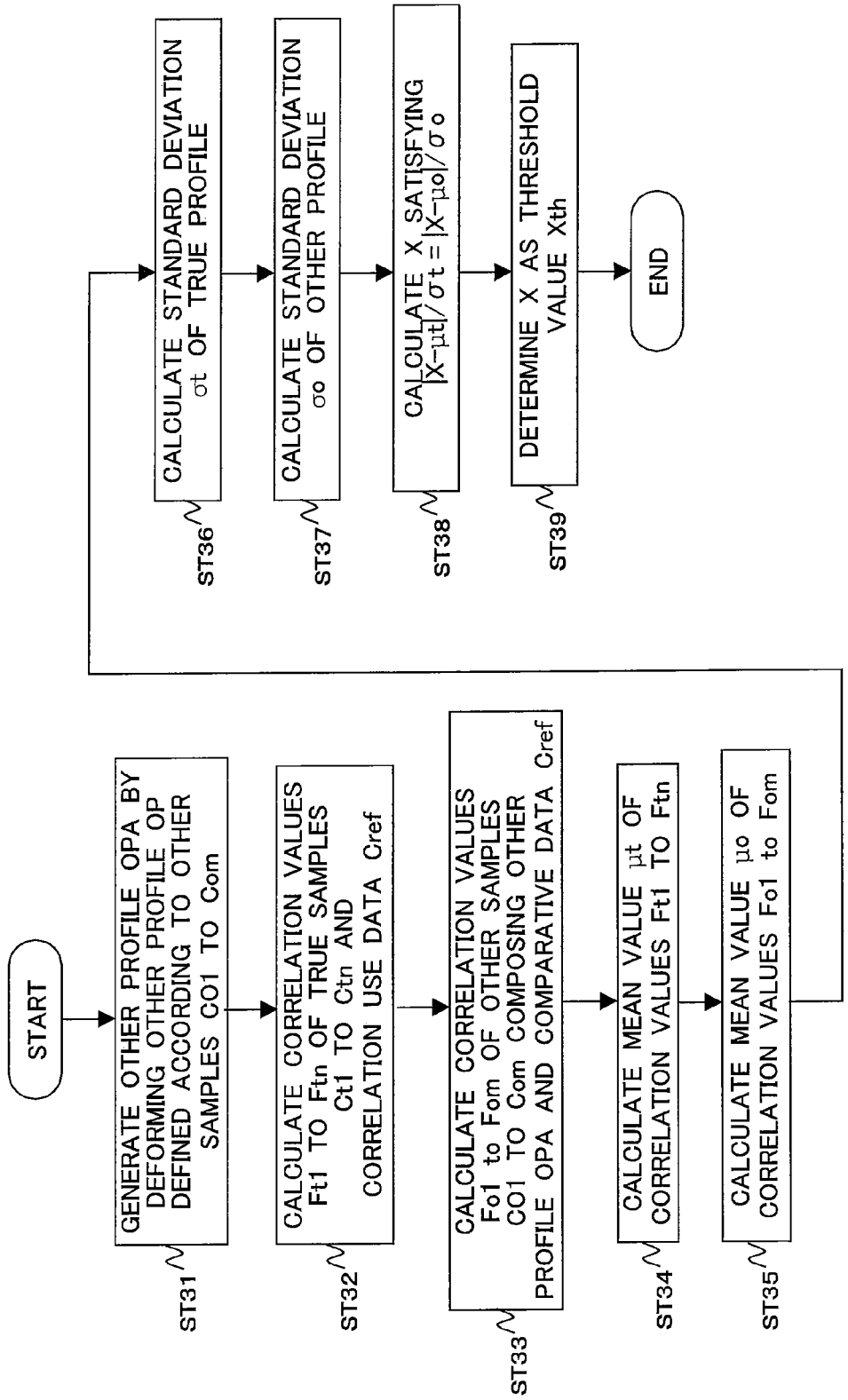
FIG. 12 is a flow chart for explaining the processing of step ST3 shown in FIG. 2 in the authentication system shown in FIG. 11.

FIG. 12 is a flow chart for explaining the processing of the threshold value determination unit 122.

Step ST32 shown in FIG. 12 is the same as step ST11 shown in FIG. 3.

Further, steps ST34 to ST39 shown in FIG. 12 are the same as steps ST13 to ST18 shown in FIG. 3.

The threshold value determination unit 122 generates the other profile OPA which becomes linearly symmetric about the maximum degree in the other profile OP defined by the other sample data Co1 to Com input at step ST2 shown in FIG. 2 as explained above.

Further, the threshold value determination unit 122, at step ST33, calculates the correlation data Fo1 to Fom indicating the correlation values with the reference characteristic data Cref read out from the memory 18 for each of the other sample data Co1 to Com composing the other profile OPA generated at step ST31.

As explained above, according to the authentication system 101, the threshold value determination unit 122 determines the threshold Xth based on the deformed other profile OPA by using the skewness of the other profile OP for the other profile OP, therefore the FAR/FRR can be stably suppressed low.

Third Embodiment

Below, the authentication system of the present embodiment will be explained by using FIG. 13 to FIG. 18.

First, the correspondence between components of the present embodiment and components of the present invention will be explained.

The present embodiment corresponds to the third to sixth aspects of the invention.

An input unit 221 corresponds to the inputting means of the third and fifth embodiments, an authentication unit 20 corresponds to the authenticating means of the third and fifth aspects of the invention, and a threshold value determination unit 222 corresponds to the threshold value determining means of the third and fifth aspects of the invention.

Further, a memory 18 corresponds to the storing means of the third and fifth aspects of the invention.

Further, the false acceptance rate FAR corresponds to the false acceptance rate of the present invention, and the false rejection rate FRR corresponds to the false rejection rate.

Figure 13:
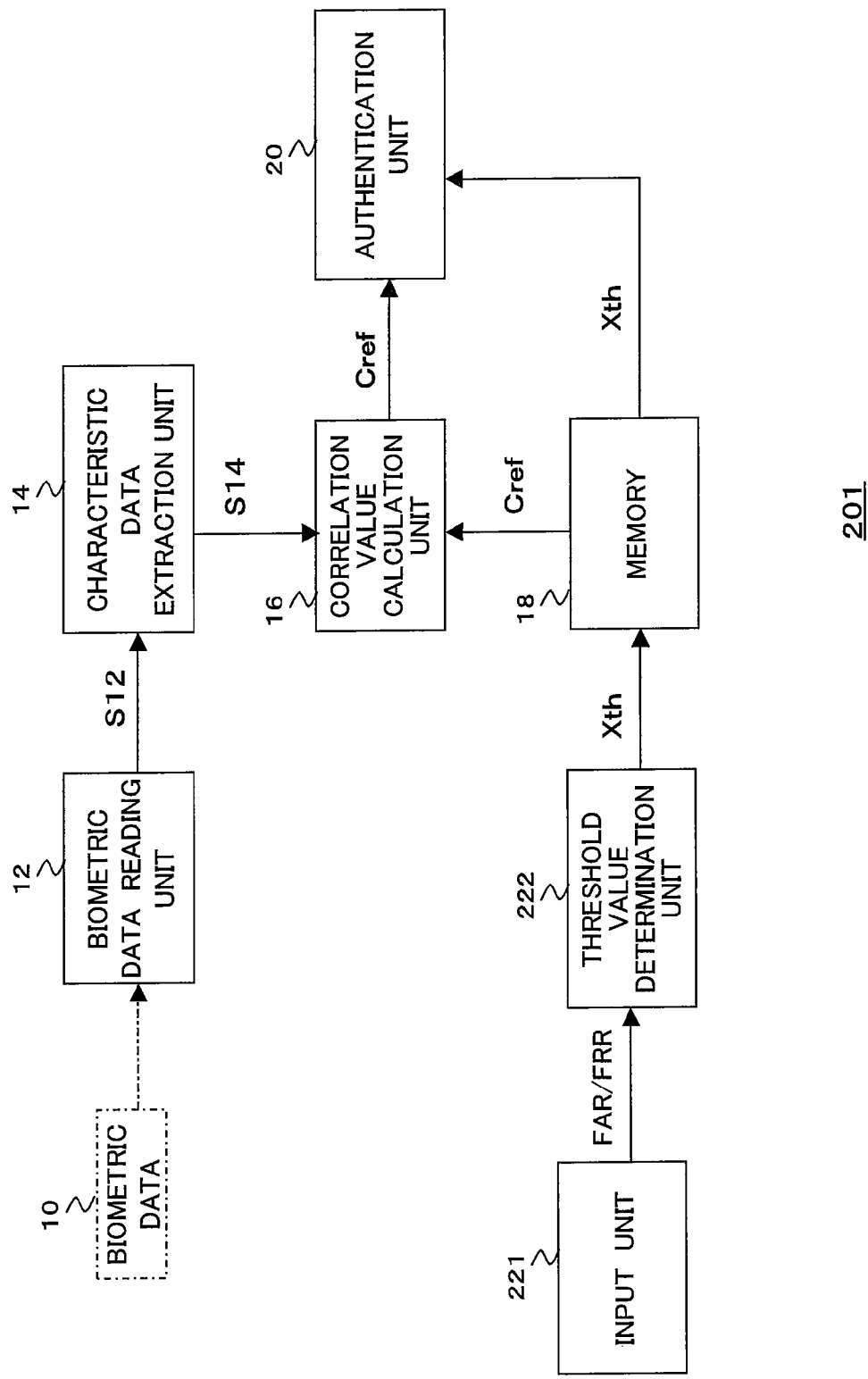
FIG. 13 is a view of the overall configuration of an authentication system of a third embodiment of the present invention.

FIG. 13 is a view of the configuration of an authentication system 201 according to this embodiment of the present invention.

As shown in FIG. 13, the authentication systems 201 has for example a biometric data reading unit 12, characteristic extraction unit 14, correlation value calculation unit 16, memory 18, authentication unit 20, input unit 221, and threshold value determination unit 222.

In FIG. 13, parts given the same notations as those in FIG. 1 are the same as those explained in the first embodiment.

Namely, the authentication system 201 has an input unit 221. The threshold value determination unit 222 is different from the threshold value determination unit 22 of the first embodiment.

The threshold value determination unit 222 is realized by executing a program by dedicated hardware such as an electronic circuit or processing circuit.

The input unit 221 is an inputting means such as a keyboard and mouse and inputs a false acceptance rate or false rejection rate FRR in response to the operation of the user.

The threshold value determination unit 222 determines the threshold value Xth so as to satisfy the false acceptance rate FAR or the false rejection rate FRR input by the input unit 221 assuming that the true profile TP and the other profile OP are according to the normal profiles.

First, the relationships between the true profile TP and the other profile OP and the false acceptance rate FAR and the false rejection rate FRR will be explained with reference to FIG. 14.

Figure 14:
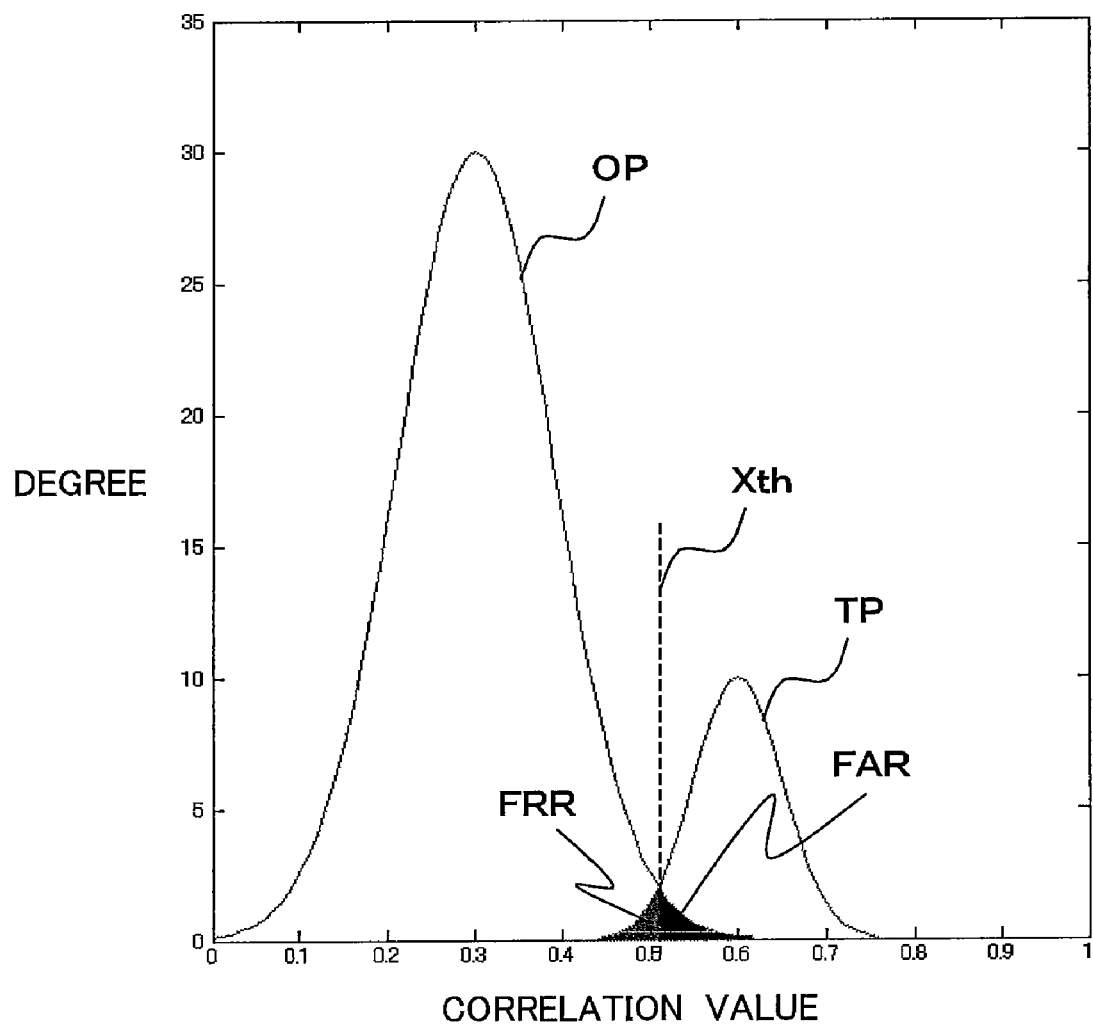
FIG. 14 is a diagram for explaining relationships of another profile and a true profile and FRR and FAR.

In FIG. 14, the false acceptance rate FAR indicates the ratio with respect to the value obtained by integrating the other profile OP from the threshold value Xth to 1 for the entire other profile OP, that is, the ratio of the area of the right side in the figure from the threshold value Xth of the other profile OP.

On the other hand, the false rejection rate FRR indicates the ratio with respect to the value obtained by integrating the true profile TP from 0 to the threshold value Xth for the entire true profile TP, that is, the area of the left side in the figure from the threshold value Xth of the true profile TP.

[Equation 10]

$$FAR = \frac{\int_{Xth}^{1} OP(x)dx}{\int_{0}^{1} OP(x)dx}, FRR = \frac{\int_{0}^{Xth} TP(x)dx}{\int_{0}^{1} TP(x)dx} \quad (10)$$

When the input unit 221 inputs the false rejection rate FRR (%), the threshold value determination unit 222 specifies a value near a value "FRR/100" corresponding to the false rejection rate FRR from the normal profile table data TABLE shown in FIG. 15 and designates the specified value as a Mahalanobis distance dt. The normal profile table data TABLE is stored in for example the memory 18 shown in FIG. 13.

At this time, the threshold value Xth becomes the following equation (11).

[Equation 11]

$$Xth = \mu t - \sigma t dt \quad (11)$$

On the other hand, when viewing the threshold value Xth in the above equation (11) for the other profile OP, the Mahalanobis distance do of the distance from the center of the other profile OP becomes as in the following equation (12).

[Equation 12]

$$do = \frac{Xth - \mu o}{\sigma o} \quad (12)$$

Then, the threshold value determination unit 222 specifies the false acceptance rate FAR as the value corresponding to the Mahalanobis distance do from the normal profile table data TABLE shown in FIG. 15.

Further, when the input unit 221 inputs the false acceptance rate FAR (%), the threshold value determination unit 222 specifies a value near a value "FAR/100" corresponding to the false acceptance rate FAR from the normal profile table data TABLE shown in FIG. 15 and determines the specified value as the Mahalanobis distance do.

At this time, the threshold value Xth becomes as in the following equation (13).

[Equation 13]

$$Xth = \mu o + \sigma o do \quad (13)$$

On the other hand, when viewing the threshold value Xth of the above equation (13) for the true profile TP, the Mahalanobis distance dt of the distance from the center of the true profile TP becomes as in the following equation (14).

[Equation 14]

$$dt = \frac{\mu t - Xth}{\sigma t} \quad (14)$$

Then, the threshold value determination unit 222 specifies the false rejection rate FRR as the value corresponding to the Mahalanobis distance dt from the normal profile table data TABLE shown in FIG. 15.

Note that, in the above example, the case of using the normal profile table data TABLE stored in the memory 18 was exemplified, but the Mahalanobis distance may be calculated by approximation based on the input false acceptance rate FAR or the false rejection rate FRR.

As the approximation, use is made of the approximation formula of Hastings et al., Maclaurin expansion formula, Shenton continued fraction expansion formula, asymptotic expansion formula, Laplace continued fraction expansion formula, Williams approximation formula, Yamauchi approximation formula, Gauss-Legendre numerical integration, etc.

Below, an example of the operation of the threshold value determination unit 222 will be explained.

Figure 16:
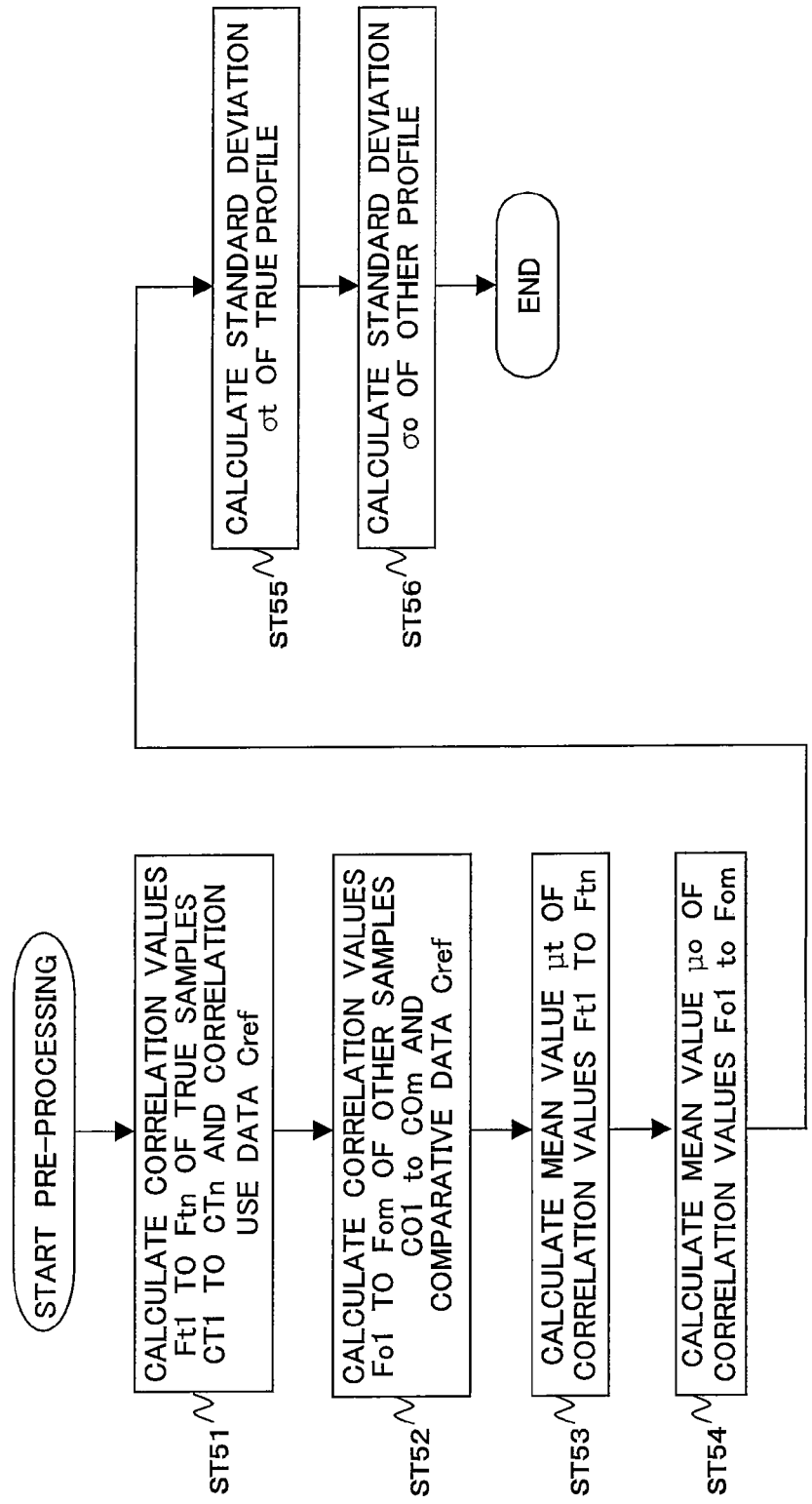
FIG. 16 is a flow chart for explaining pre-processing of the threshold value determination unit of the authentication system shown in FIG. 15.

FIG. 16 is a flow chart for explaining the pre-processing of the threshold value determination unit 222 shown in FIG. 13.

The threshold value determination unit 222 performs the pre-processing shown in FIG. 16 before the false acceptance rate FAR or the false rejection rate FRR is input.

Steps ST51 to ST56 shown in FIG. 16 are the same as steps ST11 to ST16 explained in the first embodiment by using FIG. 3.

Figure 17:
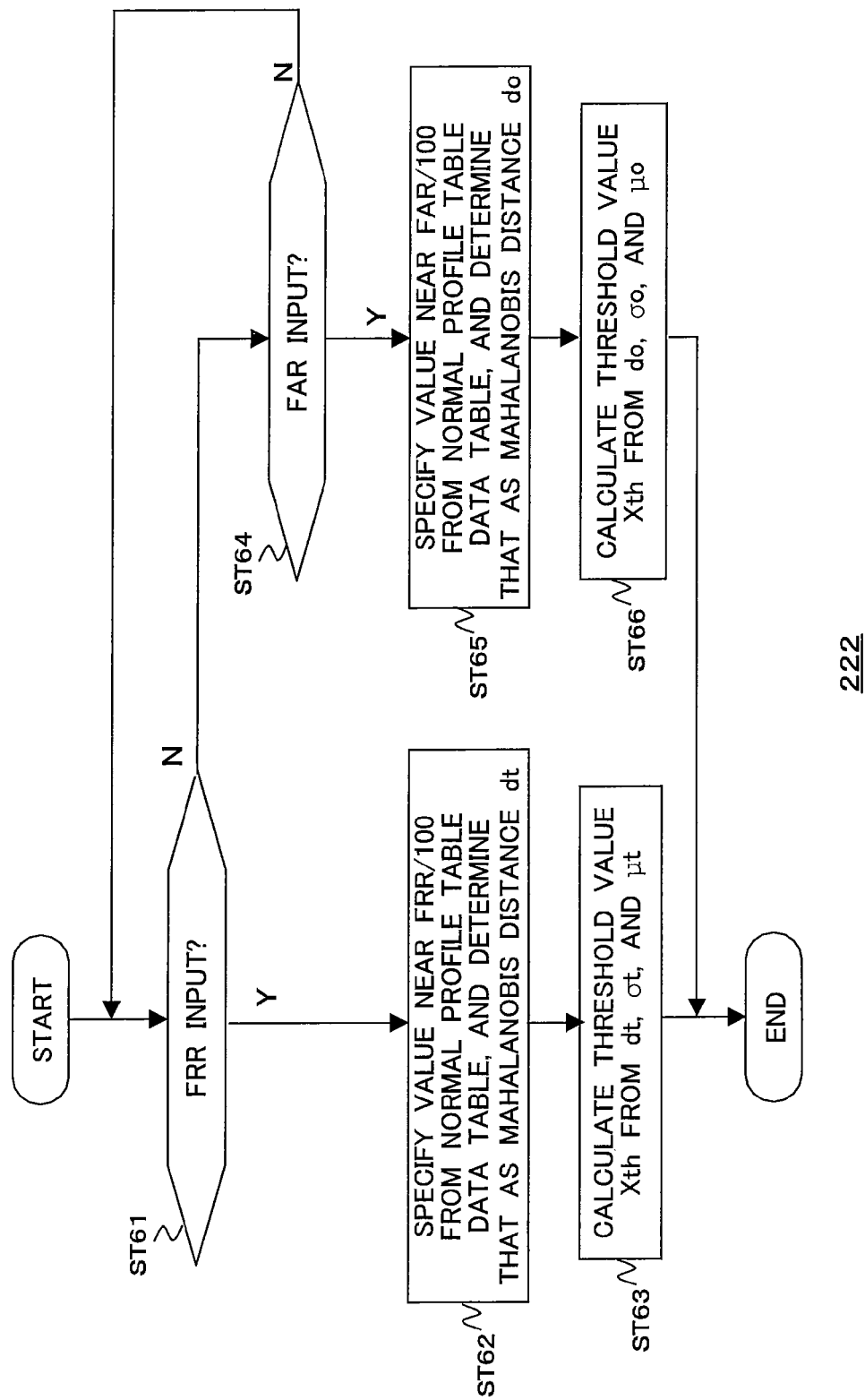
FIG. 17 is a flow chart for explaining the processing of the threshold value determination unit of the authentication systems shown in FIG. 15.

FIG. 17 is a flow chart for explaining the processing of the threshold value determination unit 222 when the false acceptance rate FAR or the false rejection rate FRR is input.

Step ST61:

The threshold value determination unit 222 judges whether or not the input unit 221 inputted the false rejection rate FRR, proceeds to step ST62 when judging it did, and proceeds to step ST64 when judging it did not.

Step ST62:

The threshold value determination unit 222 specifies the value near "FRR/100" from the normal profile table data TABLE stored in the memory 18 based on the input false rejection rate FRR and designates the specified value as the Mahalanobis distance dt.

Step ST63:

The threshold value determination unit 222 performs the computation according to above equation (11) by using the Mahalanobis distance dt acquired at step ST62, the standard deviation σt calculated at step ST55 shown in FIG. 16, and the mean value μt calculated at step ST53 to calculate the threshold value Xth.

Note that the threshold value determination unit 222 calculates the false acceptance rate FAR by using the threshold value Xth as previously explained and changes the FRR and newly calculates the threshold value Xth where this does not satisfy the predetermined condition.

Step ST64:

The threshold value determination unit 222 judges whether or not the input unit 221 inputted the false acceptance rate FAR, proceeds to step ST65 when judging it did, and returns to step ST61 when judging it did not.

Step ST65:

The threshold value determination unit 222 specifies the value near "FAR/100" from the normal profile table data TABLE stored in the memory 18 based on the input false acceptance rate FAR and designates the specified value as the Mahalanobis distance do.

Step ST66:

The threshold value determination unit 222 performs the computation according to equation (13) by using the Mahalanobis distance ot acquired at step ST65, the standard deviation σo calculated at step ST56 shown in FIG. 16, and the mean value μo calculated at step ST54 to calculate the threshold value Xth.

Note that, the threshold value determination unit 222 calculates the false acceptance rate FAR by using the threshold value Xth as previously explained and changes the FRR and newly calculates the threshold value Xth where this does not satisfy the predetermined condition.

As explained above, according to the authentication system 201, the threshold value Xth can be set so as to realize the false acceptance rate FAR or false rejection rate FRR input via the input unit 221.

For this reason, authentication tailored to the service for which the authentication of the authentication system 201 is used can be carried out. Namely, depending on the content of the service, the false acceptance rate FAR may be high, but the false rejection rate FRR is desired to be lowered. Alternatively, the false rejection rate FRR may be high, but the false acceptance rate FAR is desired to be lowered. Authentication tailored to these is possible.

Below, an example of an experiment according to the authentication system 201 will be explained.

Figure 18:
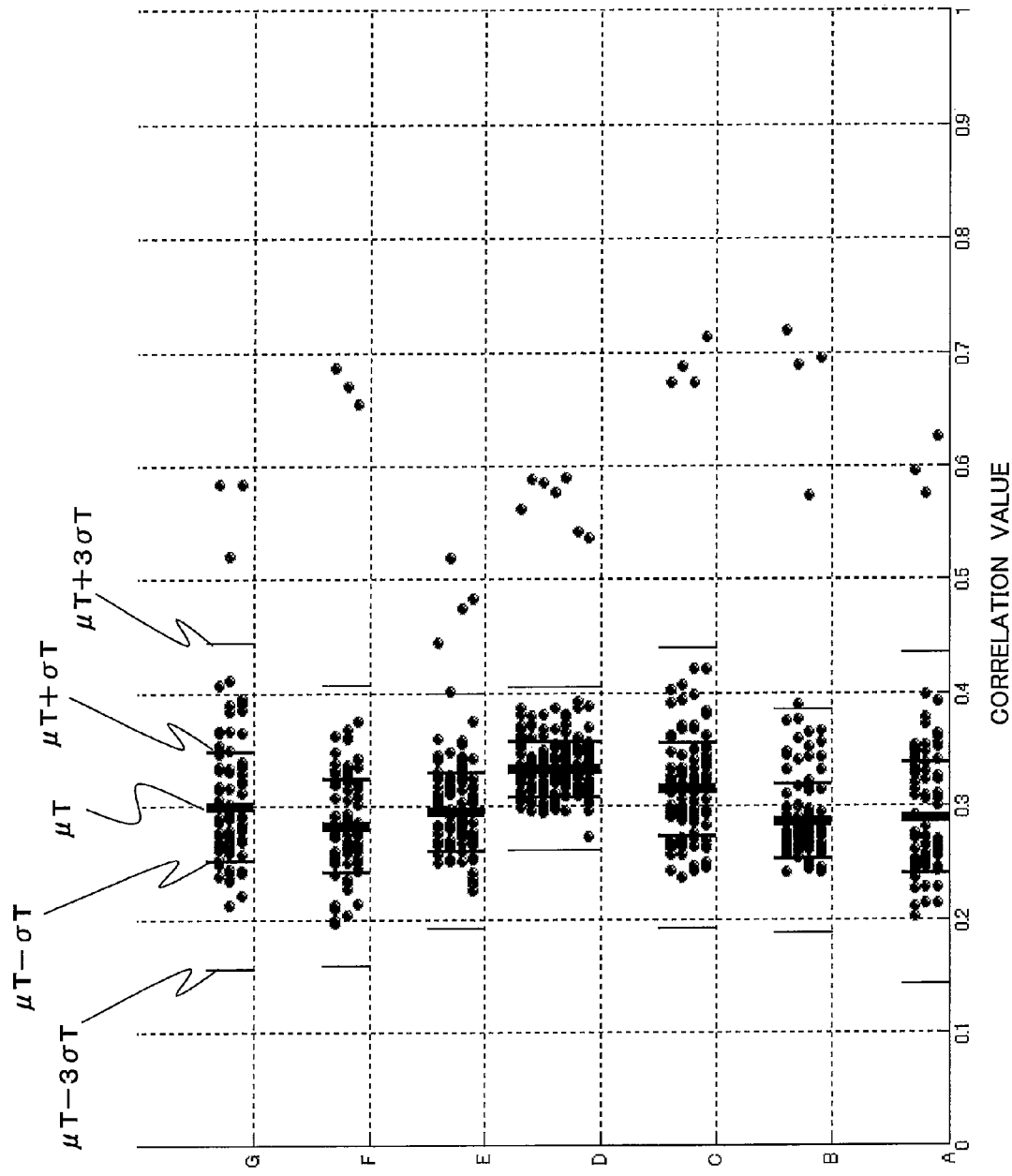
FIG. 18 is a diagram for explaining an example of an experiment of the authentication system shown in FIG. 15.

An image emphasizing only the finger vein pattern from a finger vein pattern image was used as the characteristic quantity of the true person. The correlation values of the images of the characteristic quantities were used to differentiate the true person and another person. In FIG. 18, several sets of true data are collected from seven subjects (A to G). There are exactly the number of true reference data of the true data. Points concentrated on the left side represent the correlation with the other person data, and points dispersed on the right side mean the correlation with the true data. A middle of a bar at the other person data means an average of correlation values with the other person data and means distances of σ and 3σ from the mean value.

In the example shown in FIG. 18, the true person and another person can be reliably separated with the same threshold value for any subject. That is, they may be separated when setting the threshold value at approximately 0.43. This value is determined by viewing the lowest value of the correlation values of the subject E and the true person. When the threshold value is further lowered, it becomes the maximum value of the correlation values of the subject C with the other person. That is, when the threshold value is lowered in order to avoid false rejection of the subject E, false acceptance of the subject C will be permitted. In this way, irrespective of the characteristic values extracted with the same measure, a variation occurs according to subjects, and it may be difficult to unambiguously determine the threshold value. In the case of the subject C, the maximum value of the correlation values with the other person is high, but the minimum value of the correlation values with the true person is large. That is, limited to the subject C, differentiating between the true person and another person becomes easy even when the threshold value is larger than 0.43 explained before. Further, limited to the subject D, the mean value is a little high, but the dispersion is small, therefore the threshold value can be suppressed low.

The present invention is not limited to the above embodiments.

In above embodiments, the case where the threshold value Xth was determined in the threshold value determination units 22, 122, and 222 in the authentication systems 1, 101, and 201 was exemplified, but the threshold value determination units 22, 122, and 222 may be assembled in apparatuses other than the authentication systems 1, 101, and 201, for example service apparatuses with which the authentication systems 1, 101, and 201 communicate, and the authentication systems 1, 101, and 201 may receive as input the threshold value Xth from the related apparatuses.

INDUSTRIAL APPLICABILITY

The present invention can be applied to a system for authentication based on biometric data.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An authentication system for comparing a correlation value between inspected characteristic data of biometric data acquired from a biometric subject being inspected and comparative data linked with the predetermined biometric subject and a predetermined threshold value linked with said predetermined biometric subject to authenticate whether or not said biometric subject being inspected is said predetermined biometric subject, comprising:
   a processor; and
   a memory device storing instructions which when executed by the processor, cause the processor to:
   store a threshold value defined so that a value obtained by dividing an absolute value of a difference between a first mean value of a plurality of first correlation values generated by detecting correlation with said comparative data for a plurality of first characteristic data previously acquired from said predetermined biometric subject and said threshold value by a standard deviation of said plurality of first correlation values and values obtained by dividing an absolute value of a difference between a second mean value of a plurality of second correlation values generated by detecting correlation with said comparative data for a plurality of second characteristic data previously acquired from a biometric subject other than said predetermined biometric subject and said threshold value by said plurality of second correlation values coincide; and
   compare said inspected characteristic data and the threshold value to authenticate whether or not said biometric subject being inspected is said predetermined biometric subject.

2. An authentication system as set forth in claim 1, wherein the instructions, when executed by the processor, cause the processor to determine a threshold value based on a first normal profile defined by said plurality of first correlation values and a second normal profile defined by said plurality of second correlation values.

3. An authentication system as set forth in claim 2, wherein said threshold value is based on a third normal profile defined linearly symmetrically using a pattern positioned at said first normal profile side with respect to a maximum frequency in said second normal profile.

4. An authentication method comparing a correlation value between inspected characteristic data of a biometric subject acquired from the biometric subject being inspected and comparative data linked with a predetermined biometric subject and a predetermined threshold value linked with said predetermined biometric subject to authenticate whether or not said biometric subject being inspected is said predetermined biometric subject, comprising:
- a first step of determining a threshold value so that a value obtained by dividing an absolute value of a difference between a first mean value of a plurality of first correlation values generated by detecting correlation with said comparative data for a plurality of first characteristic data previously acquired from said predetermined biometric subject and said threshold value by a standard deviation of said plurality of first correlation values and values obtained by dividing an absolute value of a difference between a second mean value of a plurality of second correlation values generated by detecting correlation with said comparative data for a plurality of second characteristic data previously acquired from a biometric subject other than said predetermined biometric subject and said threshold value by said plurality of second correlation values coincide; and
- a second step of authenticating whether or not said biometric subject being inspected is said predetermined biometric subject by comparing said inspected characteristic data and said threshold value determined at said first step.

5. An authentication method as set forth in claim 4, wherein said first step determines said threshold value based on a third normal profile defined linearly symmetrically using a pattern positioned at said first normal profile side with respect to a maximum frequency in said second normal profile when said second normal profile defined by said plurality of second characteristic data is non-linearly symmetric.

6. An authentication system comparing a correlation value between inspected characteristic data of a biometric subject acquired from the biometric subject being inspected and comparative data linked with a predetermined biometric subject and a predetermined threshold value linked with said predetermined biometric subject to authenticate whether or not said biometric subject being inspected is said predetermined biometric subject, comprising:
- an inputting means for inputting a false rejection rate showing a probability of certifying that said biometric subject being inspected who is said predetermined biometric subject is not said predetermined biometric subject;
- a processor; and
- a memory device storing instructions which when executed by the processor, cause the processor to:
  - determine said threshold value so as to satisfy said false rejection rate input by said inputting means by assuming that a plurality of correlation values generated by detecting correlation with said comparative data for the plurality of characteristic data previously acquired from said predetermined biometric subject are according to a normal profile; and
  - authenticate whether or not said biometric subject being inspected is said predetermined biometric subject by comparing the correlation value of said inspected characteristic data and said comparative data and said threshold value.

7. An authentication system as set forth in claim 6, wherein the instructions, when executed by the processor, cause the processor to store correspondence data showing linked together a Mahalanobis distance dt defined for each of a plurality of values separated by a predetermined value from a mean value of said plurality of correlation values and showing that value normalized by a standard deviation of said plurality of correlation values and said false rejection rate, and
wherein said Mahalanobis distance dt corresponding to said false rejection rate input by said inputting means is based on said correspondence data and said threshold value is based on said specified Mahalanobis distance dt, said mean value, and said standard deviation.

8. An authentication method comparing a correlation value between inspected characteristic data of a biometric subject acquired from the biometric subject being inspected and comparative data linked with a predetermined biometric subject and a predetermined threshold value linked with said predetermined biometric subject to authenticate whether or not said biometric subject being inspected is said predetermined biometric subject, comprising:
- a first step of inputting a false rejection rate showing the probability of certifying that said biometric subject being inspected which is said predetermined biometric subject is not said predetermined biometric subject;
- a second step of determining said threshold value so as to satisfy said false rejection rate input in said first step by assuming that a plurality of correlation values generated by detecting correlation with said comparative data for the plurality of characteristic data previously acquired from said predetermined biometric subject are according to a normal profile; and
- a third step of authenticating whether or not said biometric subject being inspected is said predetermined biometric subject by comparing the correlation value of said inspected characteristic data and said comparative data and said threshold value determined in said second step.

9. An authentication system comparing a correlation value between inspected characteristic data of a biometric subject acquired from the biometric subject being inspected and comparative data linked with a predetermined biometric subject and a predetermined threshold value linked with said predetermined biometric subject to authenticate whether or not said biometric subject being inspected is said predetermined biometric subject, comprising:
- an inputting means for inputting a false acceptance rate showing the probability of certifying that said biometric subject being inspected who is not said predetermined biometric subject is said predetermined biometric subject;
- a processor; and
- a memory device storing instructions which when executed by the processor, cause the processor to:
  - determine said threshold value so as to satisfy said false acceptance rate input by said inputting means by assuming that a plurality of correlation values generated by detecting correlation with said comparative data for the plurality of characteristic data previously acquired from said predetermined biometric subject are according to a normal profile; and authenticate whether or not said biometric subject being inspected is said predetermined biometric subject by comparing the correlation value of said inspected characteristic data and said comparative data and said threshold value.

10. An authentication system as set forth in claim 9, wherein the instructions, when executed by the processor, cause the processor to store correspondence data showing linked together a Mahalanobis distance dt defined for each of a plurality of values separated by a predetermined value from a mean value of said plurality of correlation values and showing that value normalized by a standard deviation of said plurality of correlation values and said false acceptance rate, and wherein said Mahalanobis distance do corresponding to said false acceptance rate input by said inputting means is based on said correspondence data and said threshold value is based on said specified Mahalanobis distance do, said mean value, and said standard deviation.

11. An authentication method for comparing a correlation value between inspected characteristic data of a biometric subject acquired from the biometric subject being inspected and comparative data linked with a predetermined biometric subject and a predetermined threshold value linked with said predetermined biometric subject to authenticate whether or not said biometric subject being inspected is said predetermined biometric subject, comprising:

a first step of inputting a false acceptance rate showing the probability of certifying that said biometric subject being inspected which is not said predetermined biometric subject is said predetermined biometric subject;

a second step of determining said threshold value so as to satisfy said false acceptance rate input in said first step by assuming that a plurality of characteristic values generated by detecting correlation with said comparative data for the plurality of characteristic data previously acquired from said predetermined biometric subject are according to a normal profile; and a third step of authenticating whether or not said biometric subject being inspected is said predetermined biometric subject by comparing the correlation values of said inspected characteristic data and said comparative data and said threshold value determined in said second step.

* * * * *